US012255550B2

(12) United States Patent
Jahns et al.

(10) Patent No.: US 12,255,550 B2
(45) Date of Patent: Mar. 18, 2025

(54) CURRENT SOURCE INVERTER USING BIDIRECTIONAL SWITCHES WITH BIDIRECTIONAL POWER FLOW CAPABILITY

(71) Applicant: Wisconsin Alumni Research Foundation, Madison, WI (US)

(72) Inventors: Thomas Merlin Jahns, Madison, WI (US); Hang Dai, Madison, WI (US); Bulent Sarlioglu, Madison, WI (US); Renato Amorim Torres, Madison, WI (US); Woongkul Lee, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 401 days.

(21) Appl. No.: 17/692,332

(22) Filed: Mar. 11, 2022

(65) Prior Publication Data
US 2022/0294365 A1 Sep. 15, 2022

Related U.S. Application Data

(60) Provisional application No. 63/160,232, filed on Mar. 12, 2021.

(51) Int. Cl.
*H02M 7/5387* (2007.01)
*H02M 1/00* (2006.01)
*H02M 7/5395* (2006.01)

(52) U.S. Cl.
CPC ..... *H02M 7/53871* (2013.01); *H02M 1/0048* (2021.05); *H02M 7/5395* (2013.01)

(58) Field of Classification Search
CPC ........... H02M 7/53871; H02M 1/0048; H02M 7/5395
See application file for complete search history.

(56) References Cited

U.S. PATENT DOCUMENTS 4,376,296 A * 3/1983 Bhagwat ............... H02M 7/521
363/136
4,730,242 A * 3/1988 Divan ................. H02M 7/4826
363/127

(Continued)

OTHER PUBLICATIONS

Dai, Hang, et al. "Integrated motor drive using soft-switching current-source inverters with SiC-and GaN-based bidirectional switches." 2020 IEEE Energy Conversion Congress and Exposition (ECCE). IEEE, 2020.

(Continued)

*Primary Examiner* — Yusef A Ahmed
(74) *Attorney, Agent, or Firm* — Bell & Manning, LLC

(57) ABSTRACT

A switching circuit includes a reverse-voltage-blocking (RB) commutation switch, a first inverter leg, and a second inverter leg. The first inverter leg includes a first dual-gate bidirectional (DGBD) and a second DGBD switch connected in series. The second inverter leg includes a third and a fourth DGBD switch connected in series. A pair of the first DGBD switch, the second DGBD switch, the third DGBD switch, and the fourth DGBD switch that are in different inverter legs of the first inverter leg and the second inverter leg are configured to switch between a first DGBD on-state and a second DGBD on-state when in an inverting operating mode. A current with a positive or a negative polarity is conducted when in the first DGBD on-state. When in the second DGBD on-state, a reverse voltage is blocked by and a current with a positive polarity is conducted through the respective DGBD switch.

17 Claims, 25 Drawing Sheets

(56) References Cited

U.S. PATENT DOCUMENTS

| | | | | |
|---|---|---|---|---|
| 4,864,483 | A * | 9/1989 | Divan | H02M 5/4585 363/37 |
| 7,142,439 | B2 * | 11/2006 | Oh | H02M 5/4585 363/37 |
| 8,130,524 | B2 | 3/2012 | Lee et al. | |
| 9,577,530 | B1 | 2/2017 | Ribarich et al. | |
| 9,917,543 | B1 | 3/2018 | Sarlioglu et al. | |
| 10,277,146 | B2 * | 4/2019 | Wang | H02J 3/381 |
| 11,575,329 | B1 * | 2/2023 | Jahns | H02P 5/74 |
| 11,728,746 | B2 * | 8/2023 | Deboy | H02M 7/53871 363/132 |
| 11,736,033 | B2 * | 8/2023 | Wang | H02M 1/0058 363/159 |
| 12,047,013 | B2 * | 7/2024 | Kundu | H02M 1/0058 |
| 2004/0165868 | A1 * | 8/2004 | Sato | H02P 27/14 388/804 |
| 2009/0096518 | A1 * | 4/2009 | Crane | H02M 7/162 327/587 |
| 2009/0285005 | A1 * | 11/2009 | Gopfrich | H02M 7/539 363/132 |
| 2010/0067264 | A1 * | 3/2010 | Ohashi | H02M 5/271 363/37 |
| 2010/0141188 | A1 * | 6/2010 | Kakebayashi | H02P 3/18 318/400.3 |
| 2011/0304212 | A1 * | 12/2011 | Choi | H02M 7/48 307/66 |
| 2012/0155135 | A1 * | 6/2012 | Fujii | H02M 7/487 363/98 |
| 2012/0250373 | A1 * | 10/2012 | Adam | H02M 3/3374 363/37 |
| 2013/0003418 | A1 | 1/2013 | Motegi | |
| 2013/0039100 | A1 * | 2/2013 | Kazama | H02M 7/497 363/41 |
| 2014/0126251 | A1 * | 5/2014 | Fujisaki | H02M 1/10 363/37 |
| 2015/0097507 | A1 | 4/2015 | Kim et al. | |
| 2015/0381047 | A1 * | 12/2015 | Chang | H02M 3/158 323/311 |
| 2016/0028224 | A1 * | 1/2016 | Yamada | H02H 9/02 363/56.11 |
| 2016/0056732 | A1 * | 2/2016 | Jussila | H02M 7/487 363/131 |
| 2016/0079892 | A1 * | 3/2016 | Arafat | H02M 1/32 318/400.28 |
| 2017/0229972 | A1 * | 8/2017 | Cerqueira Pinto Bezerra Varajão | H02M 7/797 |
| 2018/0076705 | A1 * | 3/2018 | Zhao | H02M 1/425 |
| 2018/0212510 | A1 * | 7/2018 | Takahashi | H02M 1/083 |
| 2018/0222333 | A1 * | 8/2018 | Khaligh | H02M 1/4258 |
| 2018/0343002 | A1 * | 11/2018 | Zmood | H03K 17/063 |
| 2019/0305710 | A1 * | 10/2019 | Tanahashi | H02M 1/32 |
| 2019/0319546 | A1 * | 10/2019 | Giuntini | H02M 1/4216 |
| 2020/0280267 | A1 * | 9/2020 | Restrepo | H02M 7/53871 |
| 2020/0295673 | A1 * | 9/2020 | Dai | H02M 7/53871 |
| 2020/0328698 | A1 * | 10/2020 | Deboy | H02M 7/48 |
| 2021/0341544 | A1 | 11/2021 | Vovos et al. | |
| 2022/0216806 | A1 * | 7/2022 | Kundu | H02M 7/5387 |
| 2022/0286064 | A1 * | 9/2022 | Alvi | H02M 7/5387 |
| 2022/0286072 | A1 * | 9/2022 | Gopalakrishnan | H02M 7/53871 |
| 2022/0416679 | A1 * | 12/2022 | Wang | H02M 1/0058 |
| 2023/0238895 | A1 * | 7/2023 | Moon | H02M 7/487 363/40 |
| 2024/0014749 | A1 * | 1/2024 | Mauger | H02M 7/4826 |

OTHER PUBLICATIONS

Dai, Hang, et al. "An H7 current-source inverter using wide bandgap bidirectional switches to achieve high efficiency and low conducted common-mode EMI." 2020 IEEE Applied Power Electronics Conference and Exposition (APEC). IEEE, 2020.

Dai, Hang, et al. "An H8 current-source inverter using wide bandgap bidirectional switches." *2019 IEEE Energy Conversion Congress and Exposition (ECCE)*. IEEE, 2019.

Dai, Hang, et al. "Development of high-frequency WBG power modules with reverse-voltage-blocking capability for an integrated motor drive using a current-source inverter." *2018 IEEE Energy Conversion Congress and Exposition (ECCE)*. IEEE, 2018.

Vanaparthy, Sravan Kumar. "PWM schemes for three phase current source converters." *The Faculty of the Graduate School Tennessee Technological University* (2004).

J. W. Wu et al., "1200V, 25A bi-directional Si DMOS IGBT fabricated with fusion wafer bonding," *Proc. Int. Symp. Power Semicond. DevicesICs*, pp. 95-98, 2014.

M. Baus et al., "Fabrication of Monolithic Bidirectional Switch (MBS) devices with MOS-controlled emitter structures," *Power Semicond.Devices IC's, 2006 IEEE Int. Symp.*, pp. 1-4, 2006.

S. Chowdhury, C. W. Hitchcock, Z. Stum, R. P. Dahal, I. B. Bhat, and T. P. Chow, "Operating Principles, Design Considerations, and Experimental Characteristics of High-Voltage 4H-SiC Bidirectional IGBTs," *IEEE Trans. Electron Devices*, vol. 64, No. 3, pp. 888-896, 2017.

Umeda et al., "High Power 3-phase to 3-phase Matrix Converter Using Dual-gate GaN Bidirectional Switches," in *2018 IEEE Applied Power Electronics Conference and Exposition (APEC)*, 2018, pp. 894-897.

I. Morita et al., "650 V 3.1 mΩcm2 GaN-based monolithic bidirectional switch using normally-off gate injection transistor," in *2007 IEEE International Electron Devices Meeting*, 2007, pp. 865-868.

Lasserre, et al., "Integrated Bi-directional SiC MOSFET power switches for efficient, power dense and reliable matrix converter assembly," *WiPDA 2016—4th IEEE Work. Wide Bandgap Power Devices Appl.*, pp. 188-193, 2016.

P. Wheeler and D. Grant, "Optimised input filter design and low-loss switching techniques for a practical matrix converter," *IEE Proc.— Electr. Power Appl.*, vol. 144, No. 1, p. 53, 1997.

Hornkamp, et al., "ECONOMAC the First All-In-One IGBT Module for Matrix Converters," 2001, p. 640.

Lorenzani, et al., "CSI7: A Modified Three-Phase Current-Source Inverter for Modular Photovoltaic Applications," *IEEE Trans. Ind. Electron.*, vol. 64, No. 7, pp. 5449-5459, 2017.

W. Wang, F. Gao, Y. Yang, and F. Blaabjerg, "Operation and modulation of H7 current-source inverter with hybrid SiC and Si semiconductor switches," *IEEE J. Emerg. Sel. Top. Power Electron.*, vol. 6, No. 1, pp. 387-399, 2018.

B. Wu, High-Power Converters and AC Drives. H. 10, Wiley 2006.

Dai et al., "Common-Mode EMI Examination of Three-phase Voltage-Source and Current-Source Converters Systems using WBG Devices," Conference Paper Oct. 2020, Researchgate.

Han et al., "Common-Mode Voltage Cancellation in PWM Motor Drives with Balanced Inverter Topology," *IEEE Transactions on Industrial Electronics*, vol. 64, No. 4, Apr. 2017, pp. 2683-2388.

Morya et al., "Wide Bandgap Devices in AC Electric Drives: Opportunities and Challenges," *IEEE Transactions on Transportation Electrification*, Mar. 2019.

Wang et al., "Modulation Schemes for Balanced Inverter under Single Upper/Lower Switch Fault Conditions," *2020 IEEE Energy Conversion Congress and Exposition (ECCE)*, 2020, pp. 3057-3064.

\* cited by examiner

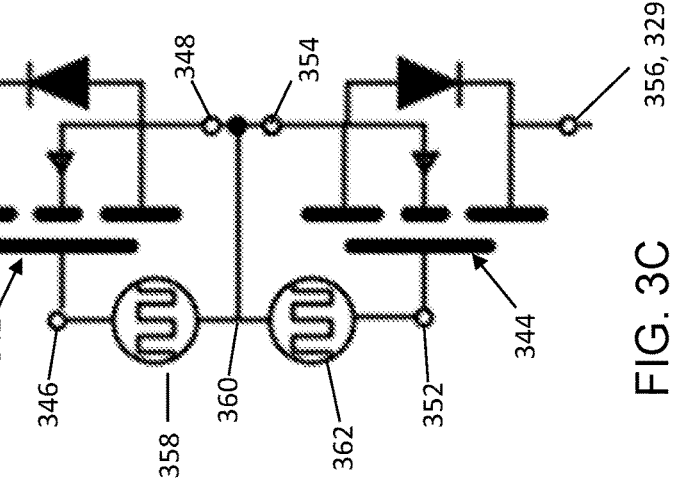
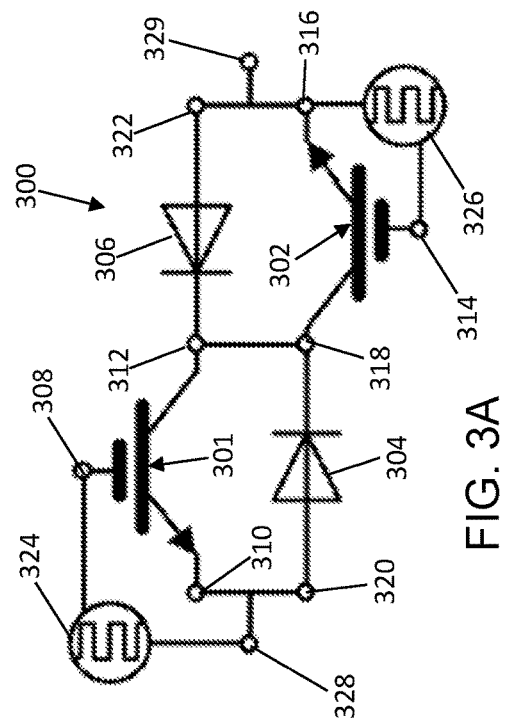
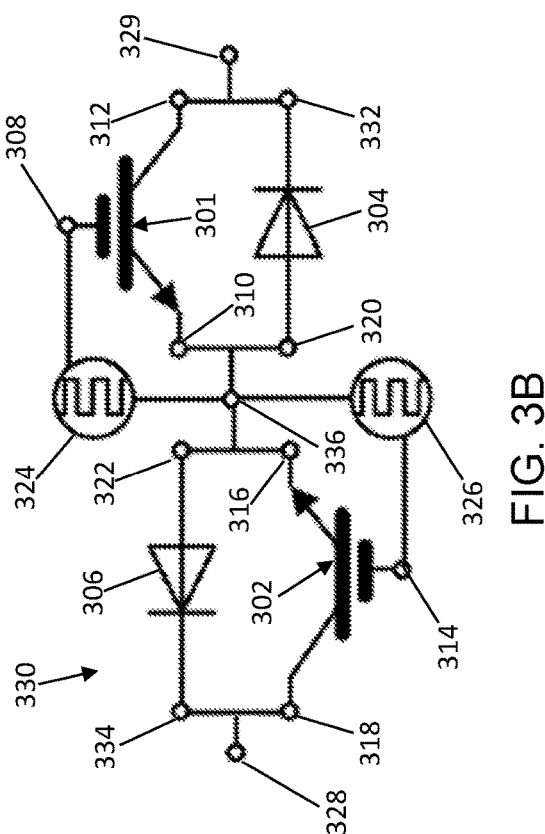
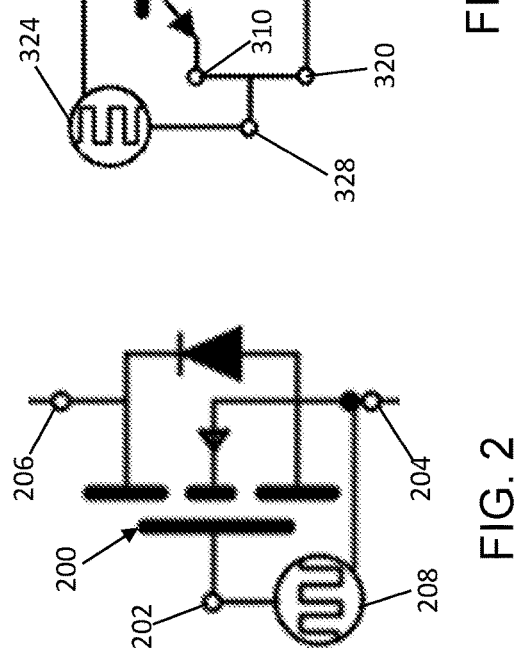

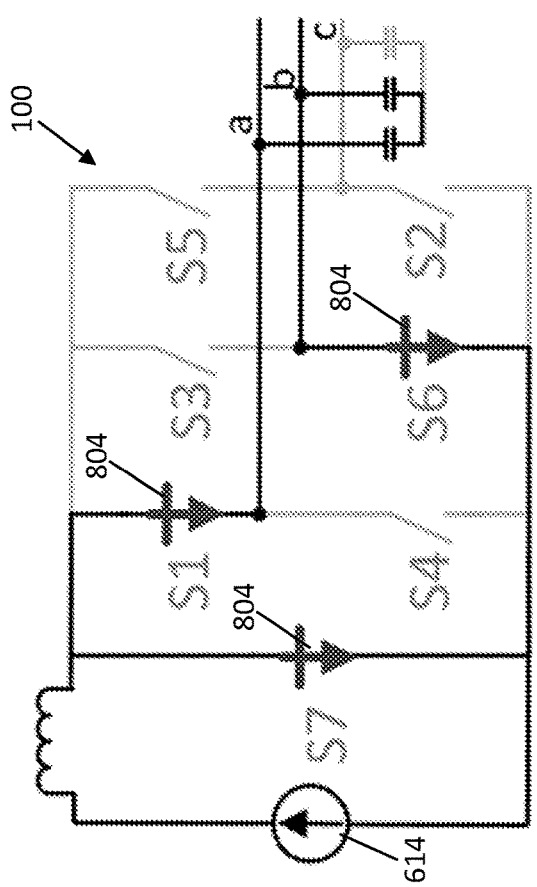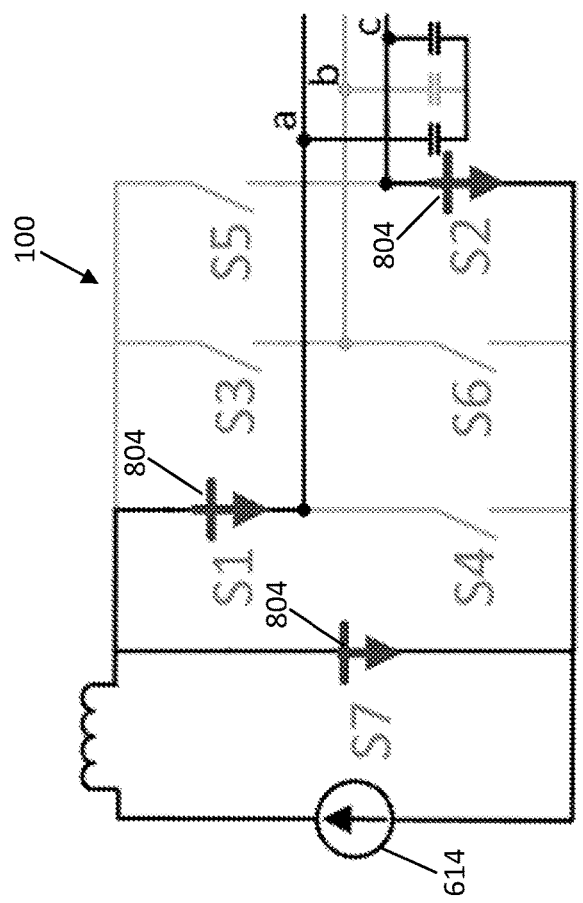
FIG. 8C
FIG. 8D

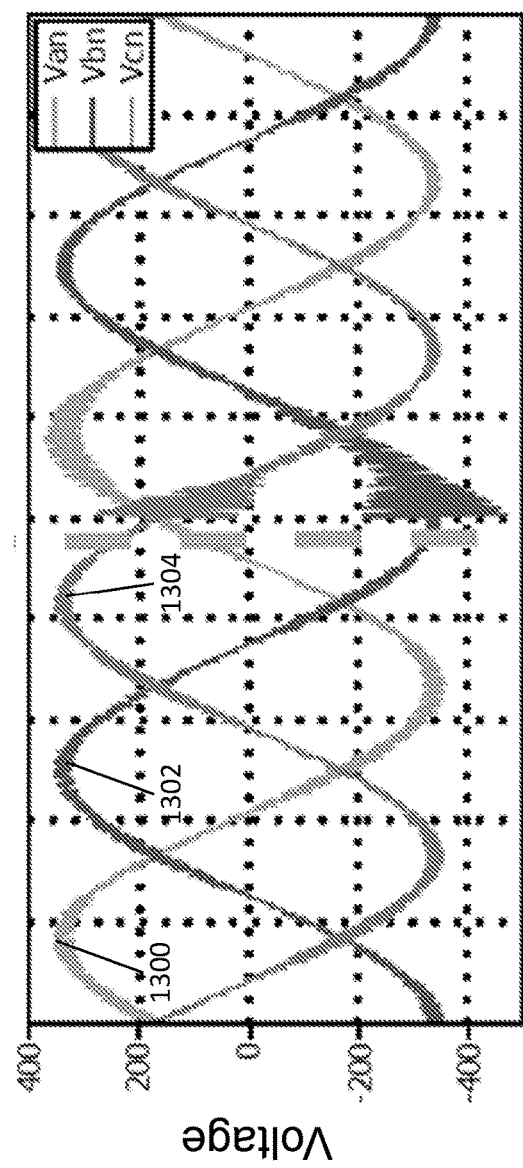
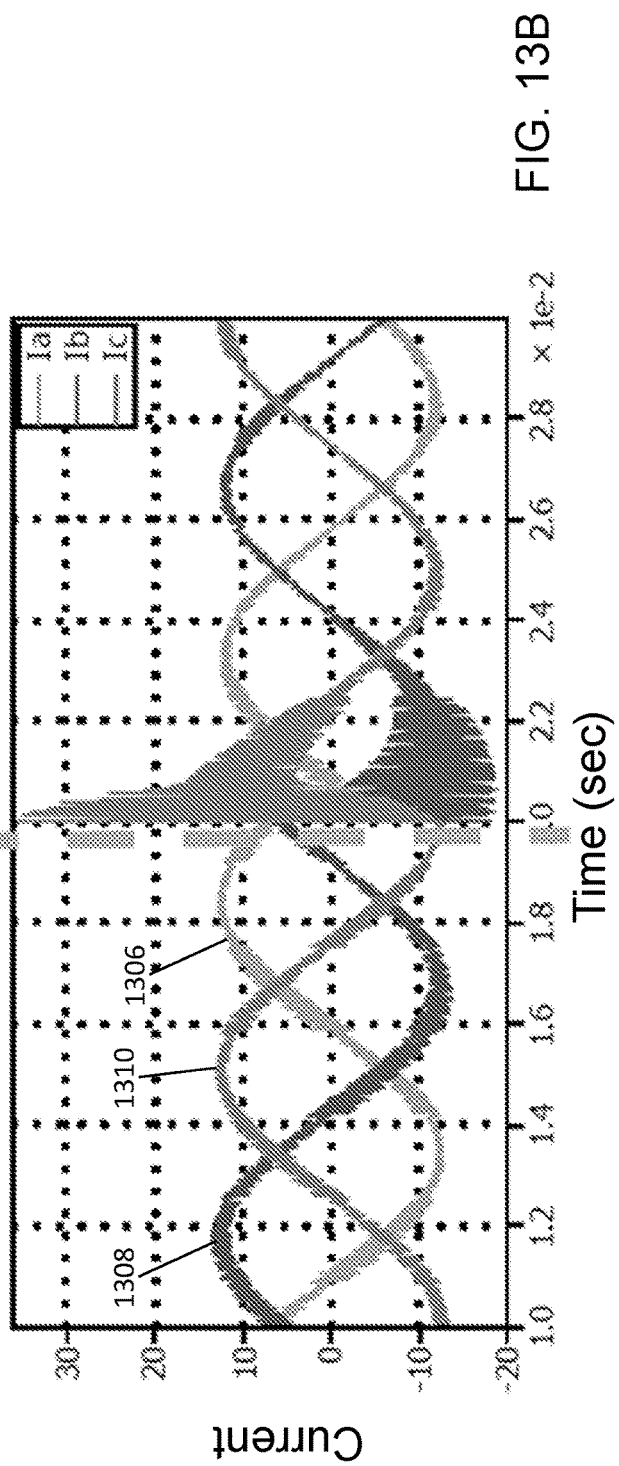

CURRENT SOURCE INVERTER USING BIDIRECTIONAL SWITCHES WITH BIDIRECTIONAL POWER FLOW CAPABILITY

CROSS REFERENCE TO RELATED APPLICATIONS

The present application claims priority to U.S. provisional patent application No. 63/160,232 that was filed Mar. 12, 2021, the entire contents of which are incorporated herein by reference.

REFERENCE TO GOVERNMENT RIGHTS

This invention was made with government support under DE-AR0000893 awarded by the DOE/ARPA-E. The government has certain rights in the invention.

BACKGROUND

Current-source inverters (CSIs) using reverse-voltage-blocking (RB) switches were dominant in the early days of power electronics and are still used in some megawatt (MW)-level motor drive applications. Due to the latching characteristics of thyristors and low switching frequency capability of thyristor-based devices like gate turn-off thyristors, such CSI systems are usually very bulky. CSIs based on non-latching reverse-voltage-blocking (RB) devices can increase the CSI's switching frequency, but the high conduction loss of available silicon (Si)-based RB switches and their limited availability have prevented CSIs using RB switches from competing with voltage-source inverters (VSIs). The non-latching silicon switches developed since the 1980s including metal-oxide-semiconductor field-effect transistors (MOSFETs) and insulated-gate bipolar transistors (IGBTs) can switch tens of kilohertz (kHz) and are naturally suitable for voltage-source inverter (VSI) topologies. However, the lack of RB capability in such devices usually requires them to be in series connection with a diode to achieve RB capability, which increases the CSI's conduction loss significantly compared to the VSI which can use the switch without the series diode.

Despite the VSIs' present dominance in commercial products, VSIs in motor drive applications result in a number of undesirable features including low reliability due to use of electrolytic direct current (DC)-link capacitors, detrimental common-mode electromagnetic interference (EMI), significant cable overvoltage, increased motor loss etc. The sinusoidal output voltage and current waveforms and the use of DC-link inductors by CSIs can naturally overcome many of these VSI disadvantages at the same time.

The H6-CSI uses a MOSFET or IGBT in series with a diode that can block reverse voltage, but only conducts current in one polarity. The H6-CSI requires overlapping commutation time between switching events to ensure that current paths are always available for the DC-link inductor and motor phase inductances in order to avoid a dangerous overvoltage.

Bidirectional (BD) switches that have RB capability with much lower conduction loss are promising for realizing high efficiency CSIs. BD switches could be used in an H6-CSI topology if their switching times were zero. However, due to their finite switching speeds, the requirement of overlapping gate signals, and the fact that a gated-on BD switch cannot block reverse voltage, BD switches result in significant transient interphase short-circuit current pulses when used in an H6-CSI when two switches are gated on. Such interphase short-circuit currents can damage the switches and output capacitors. Additionally, the hard switching of the H6-CSI topology increases the switching loss and generates significant high-frequency EMI noise that can lead to additional problems such as false gate triggering.

SUMMARY

In an example embodiment, a switching circuit for a current source inverter is provided that includes, but is not limited to, a reverse-voltage-blocking (RB) commutation switch, a first inverter leg, and a second inverter leg. The first inverter leg includes a first dual-gate bidirectional (DGBD) switch and a second DGBD switch connected in series with the first DGBD switch. The second inverter leg includes a third DGBD switch and a fourth DGBD switch connected in series with the third DGBD switch. The RB commutation switch, the first inverter leg, and the second inverter leg are connected in parallel between a first bus line and a second bus line. A pair of the first DGBD switch, the second DGBD switch, the third DGBD switch, and the fourth DGBD switch that are in different inverter legs of the first inverter leg and the second inverter leg are configured to switch between a first DGBD on-state and a second DGBD on-state when in an inverting operating mode. When in the first DGBD on-state, a current with a positive polarity or a negative polarity is conducted through a respective DGBD switch. When in the second DGBD on-state, a reverse voltage is blocked by the respective DGBD switch, and the current with the positive polarity is conducted through the respective DGBD switch.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 2 is a circuit diagram of a switch that can be included in the current source inverter of FIG. 1 in accordance with an illustrative embodiment.

FIGS. 3A-3C are circuit diagrams of dual-gate bidirectional switches that can be included in the current source inverter of FIG. 1 in accordance with illustrative embodiments.

FIGS. 8A-8F describe a switch state during a transition period for a portion of a control signal time period of FIG. 7A in accordance with an illustrative embodiment.

FIG. 13A shows a simulated three-phase voltage generated by the current source inverter of FIG. 1 before, during, and after a transition from providing power to the AC load to receiving power from the AC load in accordance with an illustrative embodiment.

FIG. 13B shows a simulated three-phase current generated by the current source inverter of FIG. 1 before, during, and after a transition from providing power to the AC load to receiving power from the AC load in accordance with an illustrative embodiment.

DETAILED DESCRIPTION

Figure 1:
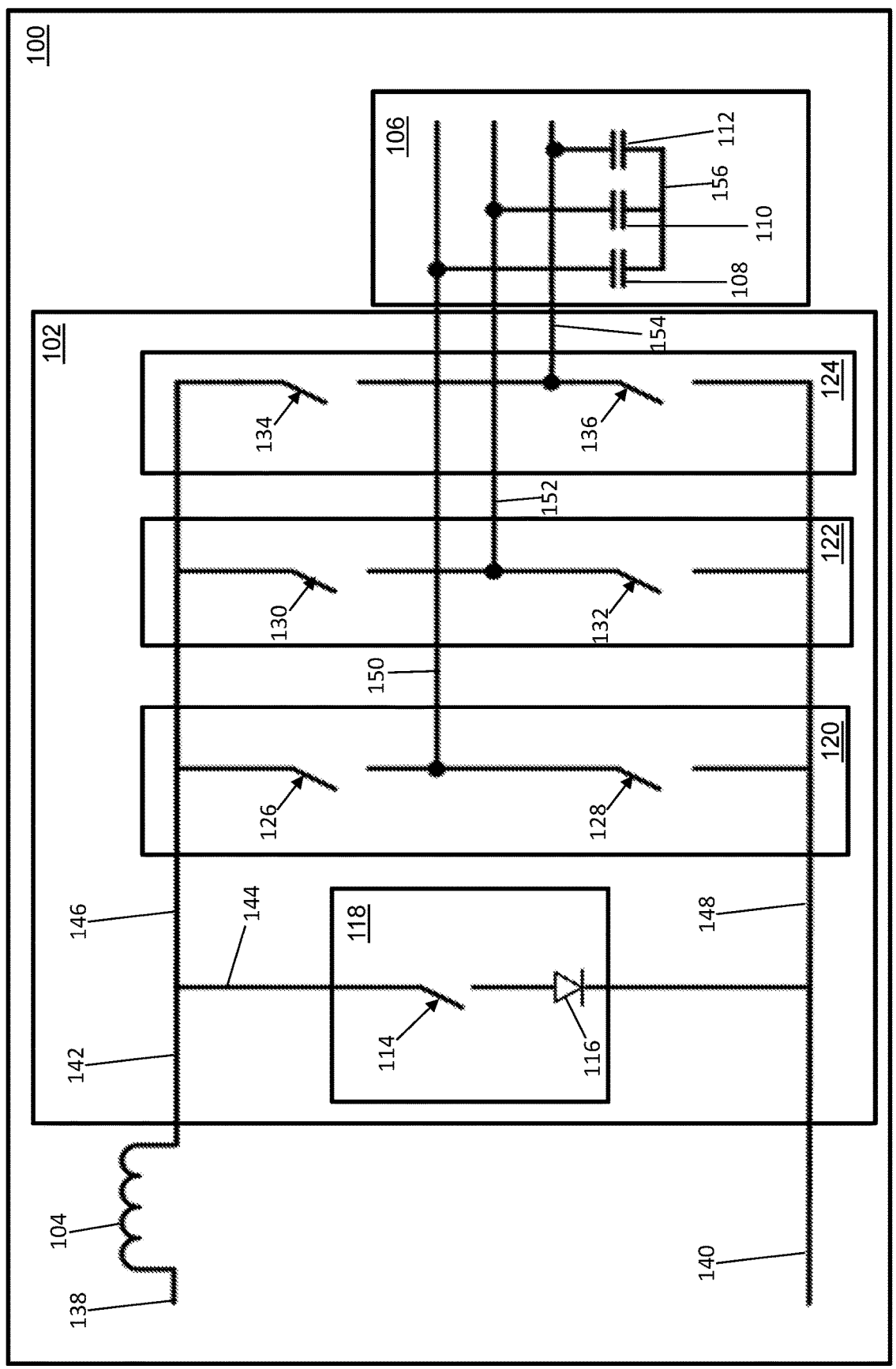
FIG. 1 is a circuit diagram of a three-phase current source inverter in accordance with an illustrative embodiment.

Referring to FIG. 1, a first current source inverter (CSI) 100 is shown in accordance with an illustrative embodiment. First CSI 100 may include an inverter switching circuit 102, an inductor 104, and a capacitive filter 106. Capacitive filter 106 may include a first capacitor 108, a second capacitor 110, and a third capacitor 112. Inverter switching circuit 102 is connected between inductor 104 and capacitive filter 106. Inverter switching circuit 102 may include a commutation switch 114, a commutation diode 116, a first inverter leg 120, a second inverter leg 122, and a third inverter leg 124. First inverter leg 120 may include a first switch 126 and a second switch 128. Second inverter leg 122 may include a third switch 130 and a fourth switch 132. Third inverter leg 124 may include a fifth switch 134 and a sixth switch 136. Commutation switch 114 and commutation diode 116 form a reverse blocking (RB) commutation switch 118.

A source line 138, a first bus line 142, a second bus line 140, a commutation switch line 144, a first bridge line 146, a second bridge line 148, a first phase line 150, a second phase line 152, a third phase line 154, and a filter line 156 can be used to describe connectivity between the electrical circuit elements of first CSI 100 where the term line may indicate any type of conductor, wire, or other conduit by which electrical energy is transmitted between electrical circuit elements.

Inductor 104 may be one or more inductors connected in series of various types with various inductance values. Though not shown, inductor 104 further may include one or more inductors connected in series on second bus line 140 between a DC current source 614 (shown referring to FIG. 6A) and inverter switching circuit 102. As understood by a person of skill in the art, an inductor is a passive two-terminal electrical component that stores energy in a magnetic field when electric current flows through it. An inductance value for inductor 104 may be selected to carry a load current based on an application area of first CSI 100 as understood by a person of skill in the art. Inductor 104 is connected on source line 138 between DC current source 614 and inverter switching circuit 102. First bus line 142 and second bus line 140 provide connections to inverter switching circuit 102 to/from DC current source 614 through inductor 104.

A capacitor of first capacitor 108, second capacitor 110, and third capacitor 112 is associated with each inverter leg of first inverter leg 120, second inverter leg 122, and third inverter leg 124, respectively. First capacitor 108 is connected between first phase line 150 and filter line 156. Second capacitor 110 is connected between second phase line 152 and filter line 156. Third capacitor 112 is connected between third phase line 154 and filter line 156. Each capacitor of capacitive filter 106 may be a capacitor of various types and with various ratings. As understood by a person of skill in the art, a capacitor is a passive two-terminal electrical component that stores electrical energy in an electric field and has an associated rated capacitance value. A rating of each capacitor of capacitive filter 106 may be selected to carry inductive current from an alternating current (AC) load 616 (shown referring to FIG. 6A) without requiring the switches of first inverter leg 120, second inverter leg 122, and third inverter leg 124 to provide a current flow-path. In alternative embodiments, other types of filters may be used based on AC load 616.

Commutation switch 114 may include a semiconductor switch formed of one or more of various types of semiconductors such as a MOSFET, a high electron mobility transistor (HEMT), etc. For example, referring to FIG. 2, commutation switch 114 may be implemented using an n-channel, enhancement mode MOSFET 200 with a gate terminal 202, a source terminal 204, and a drain terminal 206. As understood by a person of skill in the art, the terminals of different types of semiconductor devices may be labeled differently based on the type of switch. For example, for a MOSFET or an HEMT, a first terminal, a second terminal, and a third terminal may be referred to as a drain, a gate, and a source, respectively. A voltage applied to the second terminal determines a switching state of the semiconductor device, as in an on-state or as in an off-state. In the off-state, there is little or no conduction between drain terminal 206 and source terminal 204. In the on-state, there is current flow from drain terminal 206 to source terminal 204.

Figure 6A:
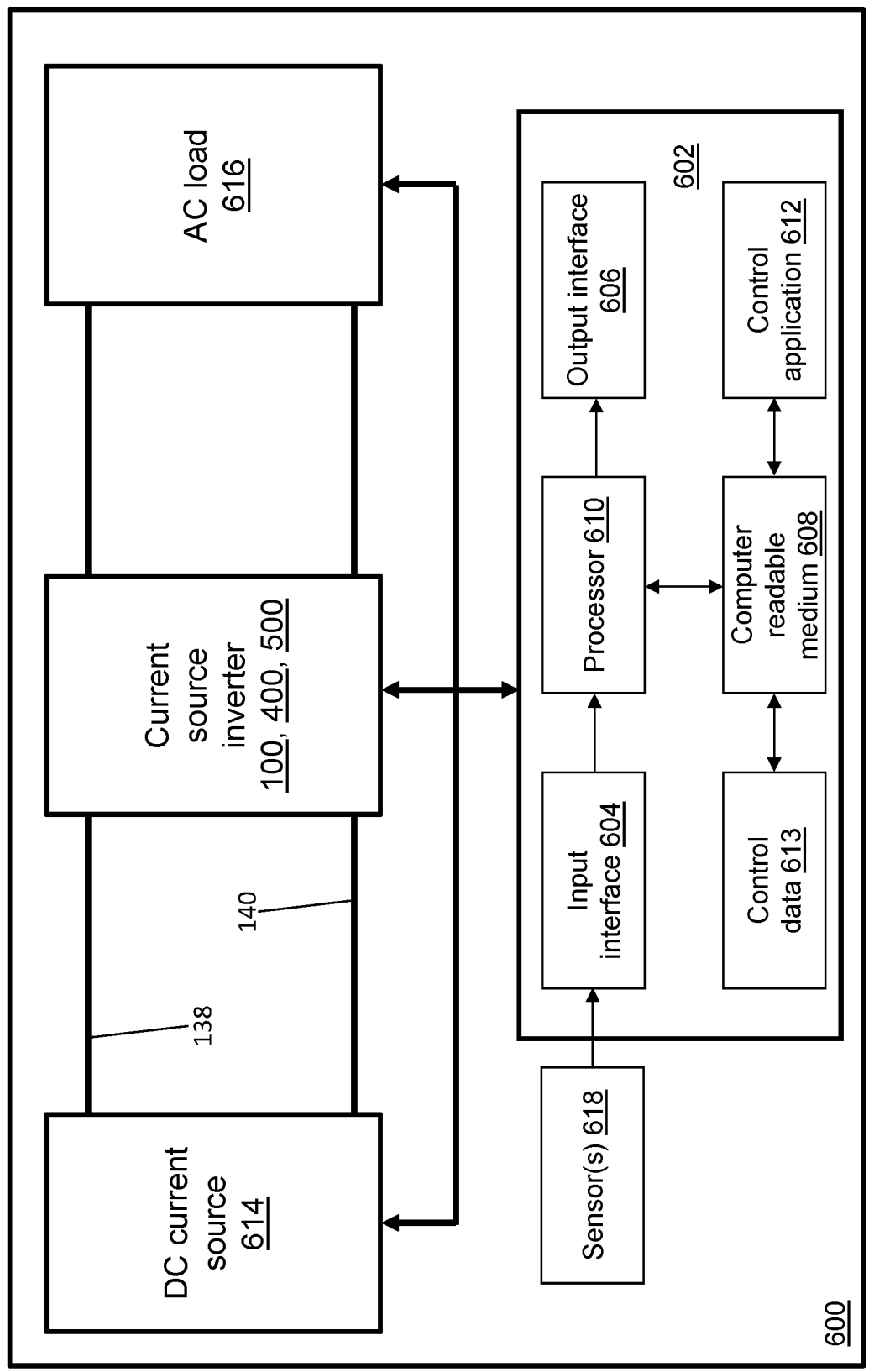
FIG. 6A is a block diagram of a power conversion system in accordance with an illustrative embodiment.

Gate terminal 202 and source terminal 204 may be connected to a pulse width modulated (PWM) signal generator 208 of a controller 602 (shown referring to FIG. 6A). Drain terminal 206 may be connected to commutation switch line 144. Source terminal 204 may be connected to the anode of commutation diode 116. Gate terminal 202 and source terminal 204 may be connected to switch together under control of PWM signal generator 208. Commutation switch 114 may be in an off-state when an off-state control signal is provided by PWM signal generator 208 of controller 602 to gate terminal 202. Commutation switch 114 may be in an on-state when an on-state control signal is provided by PWM signal generator 208 of controller 602 to gate terminal 202 and source terminal 204. For illustration, commutation switch 114 may be a silicon-carbide (SiC)-MOSFET switch.

Commutation diode 116 may be a diode of various types such as a p-n junction type, a Schottky barrier type, etc. with various ratings. As understood by a person of skill in the art, a diode is a two-terminal electrical component that conducts current primarily in one direction from an anode to a cathode. Commutation diode 116 is connected in series between commutation switch 114 and second bus line 140 with the anode of commutation diode 116 connected to receive current from commutation switch 114 and to provide current flow to second bus line 140.

First switch 126, second switch 128, third switch 130, fourth switch 132, fifth switch 134, and sixth switch 136 may be dual-gate bidirectional (DGBD) switches with controlled current flow in both polarities in addition to having reverse-voltage-blocking capability. Each DGBD includes a first semiconductor switch and a second semiconductor switch that are separately controllable by controller 102.

For example, referring to FIG. 3A, a first DGBD switch 300 is shown in accordance with an illustrative embodiment. First DGBD switch 300 can be used as first switch 126, second switch 128, third switch 130, fourth switch 132, fifth switch 134, and sixth switch 136. First DGBD switch 300 may include a first IGBT 301, a second IGBT 302, a first diode 304, and a second diode 306, where first IGBT 301 with first diode 304 is the first semiconductor switch, and second IGBT 302 with second diode 306 is the second semiconductor switch. First IGBT 301 may include a first gate terminal 308, a first emitter terminal 310, and a first collector terminal 312. Second IGBT 302 may include a second gate terminal 314, a second emitter terminal 316, and a second collector terminal 318. First diode 304 is connected anti-parallel across first IGBT 301 between a first diode terminal 320 and second collector terminal 318. First diode terminal 320 is tied to first emitter terminal 310 and to the anode of first diode 304. The cathode of first diode 304 is connected to second collector terminal 318. Second diode 306 is connected anti-parallel across second IGBT 302 between a second diode terminal 322 and first collector terminal 312. Second diode terminal 322 is connected to the anode of second diode 306. The cathode of second diode 306 is connected to first collector terminal 312. Second diode terminal 322 is tied to second emitter terminal 316. First collector terminal 312 is tied to second collector terminal 318. First gate terminal 308 and first emitter terminal 310 may be connected to switch together under control of a first PWM signal generator 324 of controller 602. Second gate terminal 314 and second emitter terminal 316 may be connected to switch together under control of a second PWM signal generator 326 of controller 602.

A first input/output (I/O) terminal 328 is connected between first diode terminal 320 and first emitter terminal 310. A second I/O terminal 329 is connected between second emitter terminal 316 and second diode terminal 322. First I/O terminal 328 provides a first connection to first DGBD switch 300, and second I/O terminal 329 provides a second connection to first DGBD switch 300. Current may flow through first DGBD switch 300 from first I/O terminal 328 to second I/O terminal 329 or vice versa to provide the current flow in both polarities.

First DGBD switch 300 can be operated in one of four states: 1) a first DGBD switch on-state when an on-state signal is provided by PWM signal generator 324 of controller 602 to first gate terminal 308 and an on-state signal is provided by PWM signal generator 326 of controller 602 to second gate terminal 314, 2) a second DGBD switch on-state when an on-state signal is provided by PWM signal generator 324 of controller 602 to first gate terminal 308 and an off-state signal is provided by PWM signal generator 326 of controller 602 to second gate terminal 314, 3) a third DGBD switch on-state when an on-state signal is provided by PWM signal generator 326 of controller 602 to second gate terminal 314 and an off-state signal is provided by PWM signal generator 324 of controller 602 to first gate terminal 308, and 4) a DGBD switch off-state when an off-state signal is provided by PWM signal generator 324 of controller 602 to first gate terminal 308 and an off-state signal is provided by PWM signal generator 326 of controller 602 to second gate terminal 314.

When first DGBD switch 300 is in the DGBD switch off-state, no current flows through first DGBD switch 300. When first DGBD switch 300 is in the first DGBD switch on-state, current can flow from first I/O terminal 328 to second I/O terminal 329 (positive polarity) or from second I/O terminal 329 to first I/O terminal 328 (negative polarity) with no reverse voltage blocking. When first DGBD switch 300 is in the second DGBD switch on-state, current flows from first I/O terminal 328 to second I/O terminal 329 with reverse voltage blocking in a first direction. When first DGBD switch 300 is in the third DGBD switch on-state, current flows from second I/O terminal 329 to first I/O terminal 328 with reverse voltage blocking in a second direction with a reverse polarity to the first direction.

As another example, referring to FIG. 3B, a second DGBD switch 330 is shown in accordance with an illustrative embodiment. Second DGBD switch 330 can be used as first switch 126, second switch 128, third switch 130, fourth switch 132, fifth switch 134, and sixth switch 136. Second DGBD switch 330 may include first IGBT 301, second IGBT 302, first diode 304, and second diode 306. First diode 304 is connected anti-parallel across first IGBT 301 between a first diode terminal 320 and a third diode terminal 332. First diode terminal 320 is connected to the anode of first diode 304. The cathode of first diode 304 is connected to third diode terminal 332. First diode terminal 320 is tied to first emitter terminal 310. Third diode terminal 332 is tied to first collector terminal 312. Second diode 306 is connected anti-parallel across second IGBT 302 between second diode terminal 322 and a fourth diode terminal 334. Second diode terminal 322 is connected to the anode of second diode 306. The cathode of second diode 306 is connected to fourth diode terminal 334. Second diode terminal 322 is tied to second emitter terminal 316. Fourth diode terminal 334 is tied to second collector terminal 318. First gate terminal 308 and first emitter terminal 310 may be connected to switch together under control of first PWM signal generator 324 of controller 602. Second gate terminal 314 and second emitter terminal 316 may be connected to switch together under control of second PWM signal generator 326 of controller 602. First PWM signal generator 324 also may be connected to second emitter terminal 316, first diode terminal 320, and second diode terminal 322 at a common terminal 336. Second PWM signal generator 326 also may be connected to first emitter terminal 310, first diode terminal 320, and second diode terminal 322 at common terminal 336.

First I/O terminal 328 is connected between fourth diode terminal 334 and second collector terminal 318. Second I/O terminal 329 is connected between third diode terminal 332 and first collector terminal 312. First I/O terminal 328 provides the first connection to second DGBD switch 330, and second I/O terminal 329 provides the second connection to second DGBD switch 330. Current may flow through second DGBD switch 330 from first I/O terminal 328 to second I/O terminal 329 or vice versa to provide the current flow in both polarities. Similar to first DGBD switch 300, second DGBD switch 330 can be operated in one of the four states.

As yet another example, referring to FIG. 3C, a third DGBD switch 340 is shown in accordance with an illustrative embodiment. Third DGBD switch 340 can be used as first switch 126, second switch 128, third switch 130, fourth switch 132, fifth switch 134, and sixth switch 136. Third DGBD switch 340 may include a first MOSFET 342 and a second MOSFET 344, where first MOSFET 342 is the first semiconductor switch, and second MOSFET 344 is the second semiconductor switch. A first gate terminal 346, a first source terminal 348, and a second source terminal 354 may be connected to switch together under control of first PWM signal generator 358 of controller 602. A second gate terminal 352, first source terminal 348, and second source terminal 354 may be connected to switch together under control of a second PWM signal generator 362 of controller 602. A signal terminal 360 is connected between first PWM signal generator 358 and second PWM signal generator 362 and to first source terminal 348 and second source terminal 354.

A first drain terminal 350 is also first I/O terminal 328, and a second drain terminal 356 is also second I/O terminal 329. First I/O terminal 328 provides the first connection to third DGBD switch 340, and second I/O terminal 329 provides the second connection to third DGBD switch 340.

Current may flow through third DGBD switch 340 from first I/O terminal 328 to second I/O terminal 329 or vice versa to provide the current flow in both polarities. Third DGBD switch 340 can be operated in one of four states: 1) a first DGBD switch on-state when an on-state signal is provided by PWM signal generator 358 of controller 602 to first gate terminal 346 and an on-state signal is provided by PWM signal generator 362 of controller 602 to second gate terminal 352, 2) a second DGBD switch on-state when an on-state signal is provided by PWM signal generator 358 of controller 602 to first gate terminal 346 and an off-state signal is provided by PWM signal generator 362 of controller 602 to second gate terminal 352, 3) a third DGBD switch on-state when an on-state signal is provided by PWM signal generator 362 of controller 602 to second gate terminal 352 and an off-state signal is provided by PWM signal generator 358 of controller 602 to first gate terminal 346, and 4) a DGBD switch off-state when an off-state signal is provided by PWM signal generator 358 of controller 602 to first gate terminal 346 and an off-state signal is provided by PWM signal generator 362 of controller 602 to second gate terminal 352.

When third DGBD switch 340 is in the DGBD switch off-state, no current flows through third DGBD switch 340. When third DGBD switch 340 is in the first DGBD switch on-state, current can flow from first I/O terminal 328 to second I/O terminal 329 (positive polarity) or from second I/O terminal 329 to first I/O terminal 328 (negative polarity) with no reverse voltage blocking. When third DGBD switch 340 is in the second DGBD switch on-state, current flows from first I/O terminal 328 to second I/O terminal 329 with reverse voltage blocking in a first direction. When third DGBD switch 340 is in the third DGBD switch on-state, current flows from second I/O terminal 329 to first I/O terminal 328 with reverse voltage blocking in a second direction with a reverse polarity to the first direction.

The switches of FIGS. 2 and 3A-3C are merely examples of a semiconductor switch and DGBD switches that may be used. For further reference, example semiconductor switches and bidirectional switches are described in H. Dai, T. M. Jahns, R. A. Torres, M. Liu, B. Sarlioglu, and S. Chang, "Development of High-Frequency WBG Power Modules with Reverse-Voltage-Blocking Capability for an Integrated Motor Drive using a Current-Source Inverter," 2018 IEEE Energy Conyers. Congr. Expo, pp. 1808-1815, 2018; J. W. Wu et al., "1200V, 25 A bidirectional Si DMOS IGBT fabricated with fusion wafer bonding," Proc. Int. Symp. Power Semicond. Devices ICs, pp. 95-98, 2014; M. Baus et al., "Fabrication of Monolithic Bidirectional Switch (MBS) devices with MOS-controlled emitter structures," Power Semicond. Devices IC's, 2006 IEEE Int. Symp., pp. 1-4, 2006; S. Chowdhury, C. W. Hitchcock, Z. Stum, R. P. Dahal, I. B. Bhat, and T. P. Chow, "Operating Principles, Design Considerations, and Experimental Characteristics of High-Voltage 4H-SiC Bidirectional IGBTs," IEEE Trans. Electron Devices, vol. 64, no. 3, pp. 888-896, 2017; H. Umeda, Y. Yamada, K. Asanuma, F. Kusama, and Y. Kinoshita, "High Power 3-phase to 3-phase Matrix Converter Using Dual-gate GaN Bidirectional Switches," in 2018 IEEE Applied Power Electronics Conference and Exposition (APEC), 2018, pp. 894-897; T. Morita et al., "650 V 3.1 mΩcm2 GaN-based monolithic bidirectional switch using normally-off gate injection transistor," in 2007 IEEE International Electron Devices Meeting, 2007, pp. 865-868; P. Wheeler and D. Grant, "Optimised input filter design and low-loss switching techniques for a practical matrix converter," IEE Proc.—Electr. Power Appl., vol. 144, no. 1, p. 53, 1997; and M. Hornkamp, M. Loddenkotter, M. Munzer, O. Simon, and M. Bruckmann, "ECONOMAC THE FIRST ALL-IN-ONE IGBT MODULE FOR MATRIX CONVERTERS," 2001, p. 640.

A gate terminal and/or a source terminal of first switch 126 (e.g., first gate terminal 346 and second gate terminal 352 of third DGBD switch 340) may be connected to a PWM signal generator (e.g., first PWM signal generator 358 and second PWM signal generator 362 of third DGBD switch 340) controlled by controller 602. The first connection of first switch 126 (e.g., first I/O terminal 328 of third DGBD switch 340) may be connected to first bridge line 146, and the second connection of first switch 126 (e.g., second I/O terminal 329 of third DGBD switch 340) may be connected to first phase line 150. For illustration, first switch 126 may be implemented using GaN-HEMTs or SiC-MOSFET transistors.

A gate terminal and/or a source terminal of second switch 128 (e.g., first gate terminal 346 and second gate terminal 352 of third DGBD switch 340) may be connected to a PWM signal generator (e.g., first PWM signal generator 358 and second PWM signal generator 362 of third DGBD switch 340) controlled by controller 602. The first connection of second switch 128 (e.g., first I/O terminal 328 of third DGBD switch 340) may be connected to first phase line 150, and the second connection of second switch 128 (e.g., second I/O terminal 329 of third DGBD switch 340) may be connected to second bridge line 148. For illustration, second switch 128 may be implemented using GaN-HEMTs or SiC-MOSFET transistors.

A gate terminal and/or a source terminal of third switch 130 (e.g., first gate terminal 346 and second gate terminal 352 of third DGBD switch 340) may be connected to a PWM signal generator (e.g., first PWM signal generator 358 and second PWM signal generator 362 of third DGBD switch 340) controlled by controller 602. The first connection of third switch 130 (e.g., first I/O terminal 328 of third DGBD switch 340) may be connected to first bridge line 146, and the second connection of third switch 130 (e.g., second I/O terminal 329 of third DGBD switch 340) may be connected to second phase line 152. For illustration, third switch 130 may be implemented using GaN-HEMTs or SiC-MOSFET transistors.

A gate terminal and/or a source terminal of fourth switch 132 (e.g., first gate terminal 346 and second gate terminal 352 of third DGBD switch 340) may be connected to a PWM signal generator (e.g., first PWM signal generator 358 and second PWM signal generator 362 of third DGBD switch 340) controlled by controller 602. The first connection of fourth switch 132 (e.g., first I/O terminal 328 of third DGBD switch 340) may be connected to second phase line 152, and the second connection of fourth switch 132 (e.g., second I/O terminal 329 of third DGBD switch 340) may be connected to second bridge line 148. For illustration, fourth switch 132 may be implemented using GaN-HEMTs or SiC-MOSFET transistors.

A gate terminal and/or a source terminal of fifth switch 134 (e.g., first gate terminal 346 and second gate terminal 352 of third DGBD switch 340) may be connected to a PWM signal generator (e.g., first PWM signal generator 358 and second PWM signal generator 362 of third DGBD switch 340) controlled by controller 602. The first connection of fifth switch 134 (e.g., first I/O terminal 328 of third DGBD switch 340) may be connected to first bridge line 146, and the second connection of fifth switch 134 (e.g., second I/O terminal 329 of third DGBD switch 340) may be connected to third phase line 154. For illustration, fifth switch 134 may be implemented using GaN-HEMTs or SiC-MOSFET transistors.

A gate terminal and/or a source terminal of sixth switch 136 (e.g., first gate terminal 346 and second gate terminal 352 of third DGBD switch 340) may be connected to a PWM signal generator (e.g., first PWM signal generator 358 and second PWM signal generator 362 of third DGBD switch 340) controlled by controller 602. The first connection of sixth switch 136 (e.g., first I/O terminal 328 of third DGBD switch 340) may be connected to third phase line 154, and the second connection of sixth switch 136 (e.g., second I/O terminal 329 of third DGBD switch 340) may be connected to second bridge line 148. For illustration, sixth switch 136 may be implemented using GaN-HEMTs or SiC-MOSFET transistors.

First phase line 150, second phase line 152, and third phase line 154 are connected between the pair of switches of first inverter leg 120, second inverter leg 122, and third inverter leg 124, respectively, and to AC load 616 through capacitive filter 106.

First CSI 100 converts an input DC current from DC current source 614 on source line 138 to a three-phase current output signal with a first phase current signal output on first phase line 150, with a second phase current signal output on second phase line 152, and with a third phase current signal output on third phase line 154. Capacitive filter 106 may be configured to reduce voltage spikes by reducing a rate of rise and fall of the first phase current signal, the second phase current signal, and the third phase current signal. First phase line 150, second phase line 152, and third phase line 154 may be connected to provide the three-phase current output signal to AC load 616 such as an induction motor, an electric utility grid, a local electric grid such as in a residence, etc.

Figure 4:
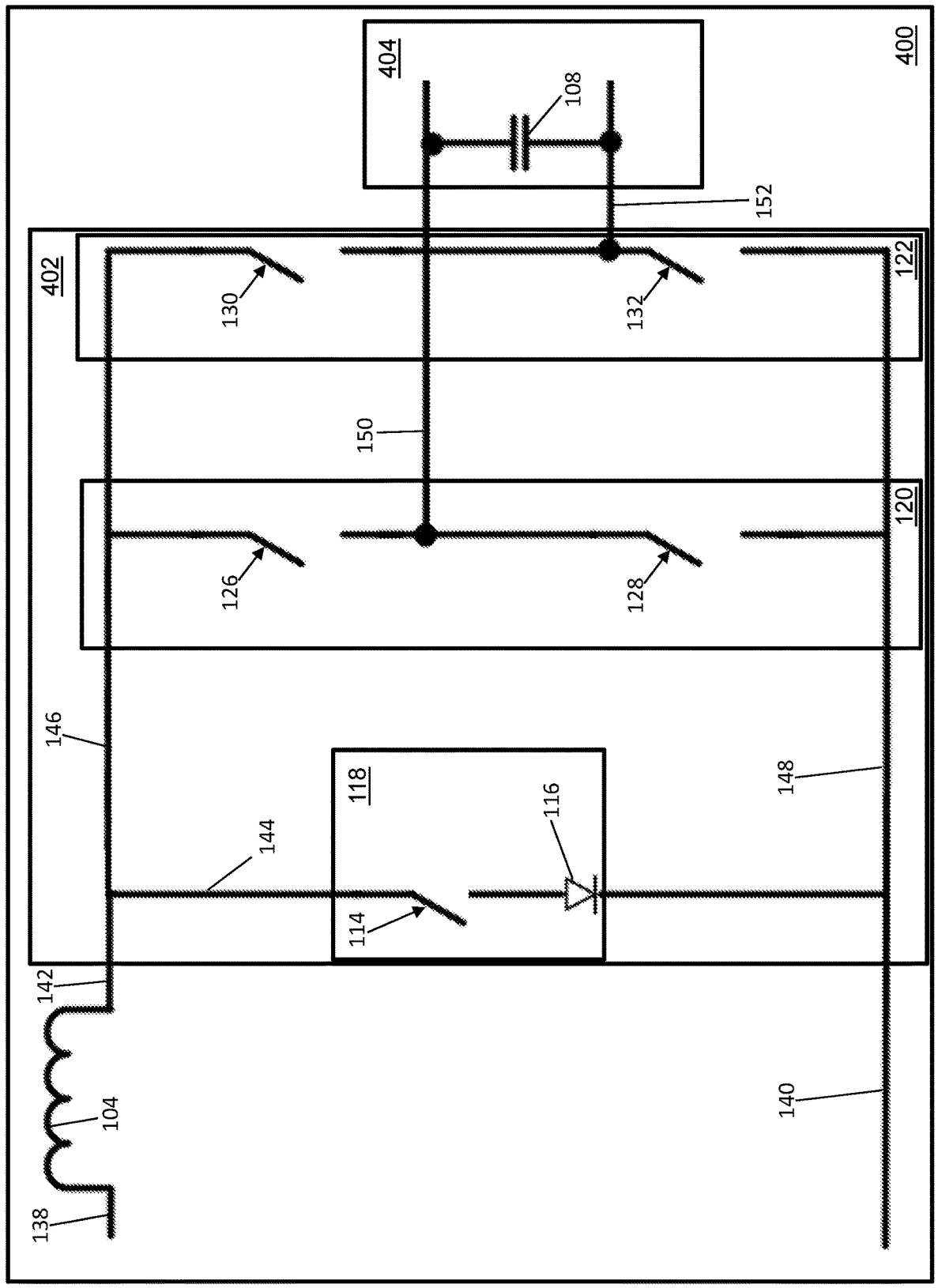
FIG. 4 is a circuit diagram of a single-phase current source inverter in accordance with an illustrative embodiment.

First CSI 100 may be modified to support a greater or a fewer number of phases of the current output signal. For example, referring to FIG. 4, a second CSI 400 is shown in accordance with an illustrative embodiment. Second CSI 400 is similar to first CSI 100 except that second CSI 400 generates a single-phase current output signal instead of the three-phase current output signal from first CSI 100. Second CSI 400 may include a second switching circuit 402, inductor 104, and a second capacitive filter 404. Second capacitive filter 404 may include first capacitor 108. Second switching circuit 402 is connected between inductor 104 and second capacitive filter 404. Second switching circuit 402 may include commutation switch 114, commutation diode 116, first inverter leg 120, and second inverter leg 122. First capacitor 108 is connected between first phase line 150 and second phase line 152.

Second CSI 400 converts the input DC from DC current source 614 on source line 138 to a single-phase current output signal output on first phase line 150. Second capacitive filter 404 may be configured to reduce voltage spikes by reducing a rate of rise and fall of the first phase current signal. First phase line 150 may be connected to provide the single-phase current output signal to AC load 616.

Figure 5:
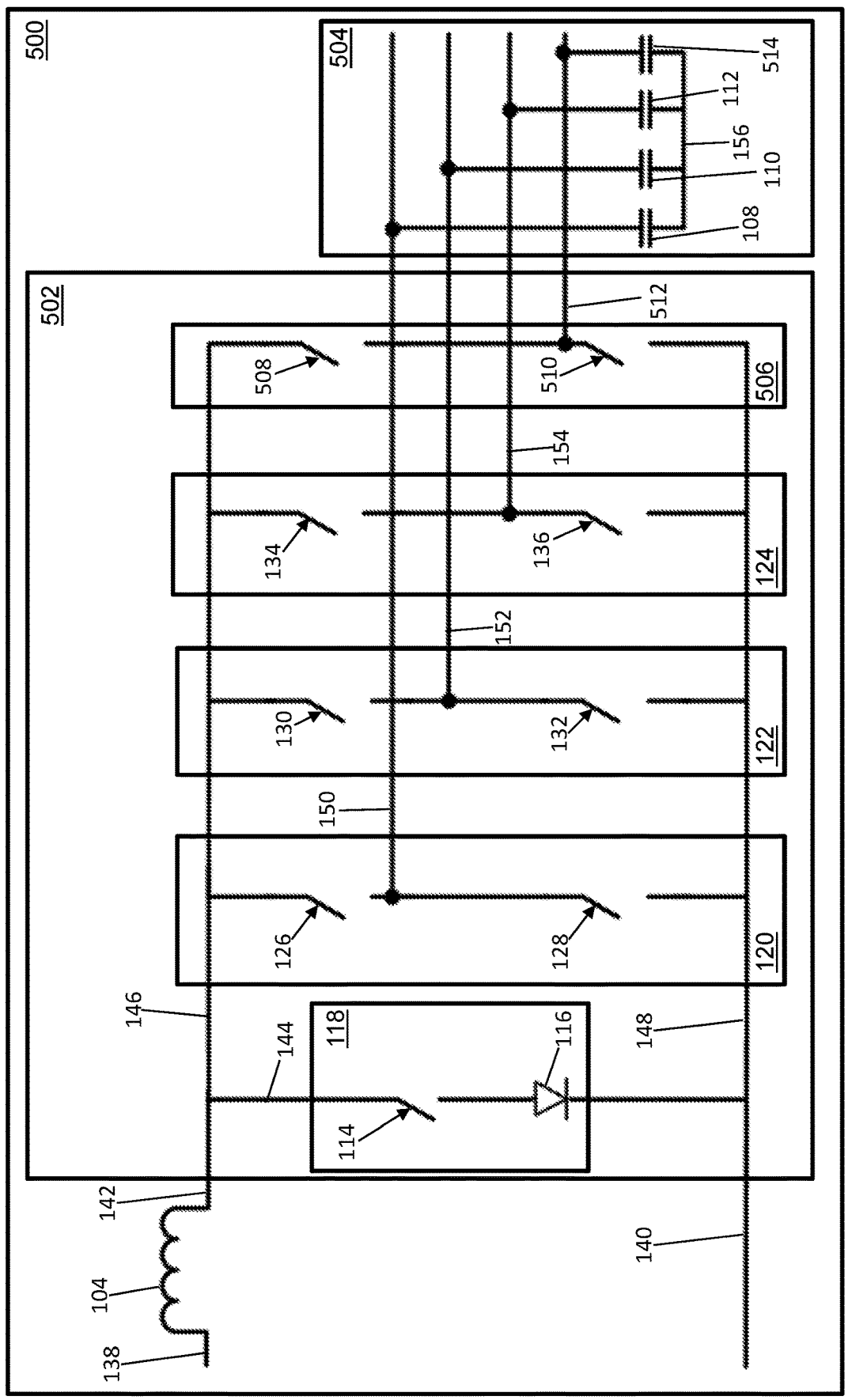
FIG. 5 is a circuit diagram of a four-phase current source inverter in accordance with an illustrative embodiment.

As another example, referring to FIG. 5, a third CSI 500 is shown in accordance with an illustrative embodiment. Third CSI 500 may be similar to first CSI 100 except that third current source inverter 400 generates a four-phase current output signal instead of the three-phase current output signal from first CSI 100. Third CSI 500 may include a third switching circuit 502, inductor 104, and a third capacitive filter 504. Third capacitive filter 504 may include first capacitor 108, second capacitor 110, third capacitor 112, and a fourth capacitor 514. Third switching circuit 502 is connected between inductor 104 and third capacitive filter 504. Third switching circuit 502 may include commutation switch 114, commutation diode 116, first inverter leg 120, second inverter leg 122, third inverter leg 124, and a fourth inverter leg 506. Fourth inverter leg 506 may include a ninth switch 508 and a tenth switch 510. Fourth capacitor 514 is connected between a fourth phase line 512 and filter line 156.

A gate terminal and/or a source terminal of ninth switch 508 (e.g., first gate terminal 346 and second gate terminal 352 of third DGBD switch 340) may be connected to a PWM signal generator (e.g., first PWM signal generator 358 and second PWM signal generator 362 of third DGBD switch 340) controlled by controller 602. The first connection of ninth switch 508 (e.g., first I/O terminal 328 of third DGBD switch 340) may be connected to first bridge line 146, and the second connection of ninth switch 508 (e.g., second I/O terminal 329 of third DGBD switch 340) may be connected to fourth phase line 512. For illustration, ninth switch 508 may be a SiC-MOSFET switch.

A gate terminal and/or a source terminal of tenth switch 510 (e.g., first gate terminal 346 and second gate terminal 352 of third DGBD switch 340) may be connected to a PWM signal generator (e.g., first PWM signal generator 358 and second PWM signal generator 362 of third DGBD switch 340) controlled by controller 602. The first connection of tenth switch 510 (e.g., first I/O terminal 328 of third DGBD switch 340) may be connected to fourth phase line 512, and the second connection of tenth switch 510 (e.g., second I/O terminal 329 of third DGBD switch 340) may be connected to second bridge line 148. For illustration, tenth switch 510 may be a SiC-MOSFET switch.

Third CSI 500 converts the input DC from DC current source 614 on source line 138 to a four-phase current output signal with first phase current signal output on first phase line 150, with second phase current signal output on second phase line 152, with third phase current signal output on third phase line 154, and with a fourth phase current signal output on fourth phase line 512. Third capacitive filter 504 may be configured to reduce voltage spikes by reducing a rate of rise and fall of the first phase current signal, the second phase current signal, the third phase current signal, and the fourth phase current signal. First phase line 150, second phase line 152, third phase line 154, and fourth phase line 512 may be connected to provide the four-phase current output signal to AC load 616.

Referring to FIG. 6A, a block diagram of a power conversion system 600 is shown in accordance with an illustrative embodiment. Power conversion system 600 may include controller 602, DC current source 614, AC load 616, a sensor(s) 618, and one or more of first CSI 100, second CSI 400, third CSI 500, etc. For example, DC current source 614 may be a DC current source such as a battery, a solar panel, a current source rectifier, etc. Controller 602 may be electrically connected to DC current source 614 and to AC load 616 to receive voltage, current, and/or power values used to define the parameters that control the energy transfer between DC current source 614 and AC load 616 through first CSI 100, second CSI 400, third CSI 500, etc. For brevity, hereafter CSI 100, 400, 500 refers to any of first CSI 100, second CSI 400, third CSI 500, as well as other CSI that support additional phases. Controller 602 is also electrically connected to CSI 100, 400, 500 to receive a value of the DC-link current, for example, as well as to provide the gating signals, for example, to first PWM signal generator 358 and second PWM signal generator 362 of each inverter leg switch, and to PWM signal generator 208 of commutation switch 114 to control transmission of each on-state switching signal and each off-state switching signal. The voltage, current, and/or power values may be received for each switching frequency interval, also referred to herein as a switching period $T_s$, or may be received less frequently or more frequently depending on the dynamic needs of power conversion system 600.

Power conversion system 600 may include one or more sensors 618 of the same or different type to measure system characteristics that may warrant a transition of power conversion system 600 from an inverting operating mode where energy is transferred from DC current source 614 to AC load 616 to a regenerating operating mode where energy is transferred from AC load 616 to DC current source 614. Sensor(s) 618 may measure a physical quantity in an environment to which the sensor is associated and generate a corresponding measurement datum that may be associated with a time that the measurement datum is generated. Illustrative sensors include a pressure sensor, a temperature sensor, a position or location sensor, a voltage sensor, a current sensor, a frequency sensor, a speed sensor, etc. that may be mounted to various components used as part of a system to which power conversion system 600 is providing and/or receiving power.

Controller 602 may include an input interface 604, an output interface 606, a computer-readable medium 608, a processor 610, a control application 612, and control data 613. Fewer, different, and additional components may be incorporated into controller 602. For example, controller 602 may include a communication interface (not shown). The communication interface provides an interface for receiving and transmitting data between devices using various protocols, transmission technologies, and media as understood by those skilled in the art. The communication interface may support communication using various transmission media that may be wired and/or wireless.

Input interface 604 provides an interface for receiving information from a user or from other devices for entry into controller 602 as understood by those skilled in the art. For example, controller 602 may receive a signal from sensor(s) 618 continuously, periodically, when an event occurs, etc. through input interface 604. Input interface 604 may further interface with various input technologies including, but not limited to, a keyboard, a mouse, a display, a track ball, a keypad, one or more buttons, etc. to allow the user to enter information into controller 602 or to make selections in a user interface displayed on the display. The same interface may support both input interface 604 and output interface 606. Controller 602 may have one or more input interfaces that use the same or a different input interface technology. Inputs through input interface 604 may include the voltage, current, and/or power values received from DC current source 614 and/or AC load 616.

Output interface 606 provides an interface for outputting information for review by a user of controller 602 and for input to another device. For example, output interface 606 may interface with various output technologies including, but not limited to, the display. Controller 602 may have one or more output interfaces that use the same or a different interface technology. Additional outputs through output interface 606 from controller 602 may be the switching signals sent to CSI 100, 400, 500, for example, by one or more of the PWM signal generators to each switch depending on the embodiment. For example, control application 612 may determine which switches of CSI 100, 400, 500 are in an on-state (e.g., first on-state, second on-state) and which are in an off-state. These signals may be provided to the switches of CSI 100, 400, 500 through output interface 606 using a respective PWM signal generator.

Computer-readable medium 608 is an electrical holding place or storage for information so the information can be accessed by processor 610 as understood by those skilled in the art. Computer-readable medium 608 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Controller 602 may have one or more computer-readable media that use the same or a different memory media technology. For example, computer-readable medium 608 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Controller 602 also may have one or more drives that support the loading of a memory media such as a CD, DVD, an external hard drive, etc. One or more external hard drives further may be connected to controller 602 using the communication interface.

Processor 610 executes instructions as understood by those skilled in the art. The instructions may be carried out by a special purpose computer, logic circuits, or hardware circuits. Processor 610 may be implemented, for example, as a field programmable gate array. Processor 610 may be implemented in hardware and/or firmware. Processor 610 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 610 operably couples with input interface 604, with output interface 606, and with computer-readable medium 608 to receive, to send, and to process information. Processor 610 may retrieve a set of instructions from a permanent memory device and copy the instructions in an executable form to a temporary memory device that is generally some form of RAM. Controller 602 may include a plurality of processors that use the same or a different processing technology.

Control application 612 performs operations associated with implementing some or all of the control of CSI 100, 400, 500 possibly based on sensor measurements from sensor(s) 618 among other sensors included as part of DC current source 614 and AC load 616. The operations may be implemented using hardware, firmware, software, or any combination of these methods. Referring to the example embodiment of FIG. 6A, control application 612 is implemented in software (comprised of computer-readable and/or computer-executable instructions) stored in computer-readable medium 608 and accessible by processor 610 for execution of the instructions that embody the operations of control application 612. Control application 612 may be written using one or more programming languages, assembly languages, scripting languages, etc.

Figure 6B:
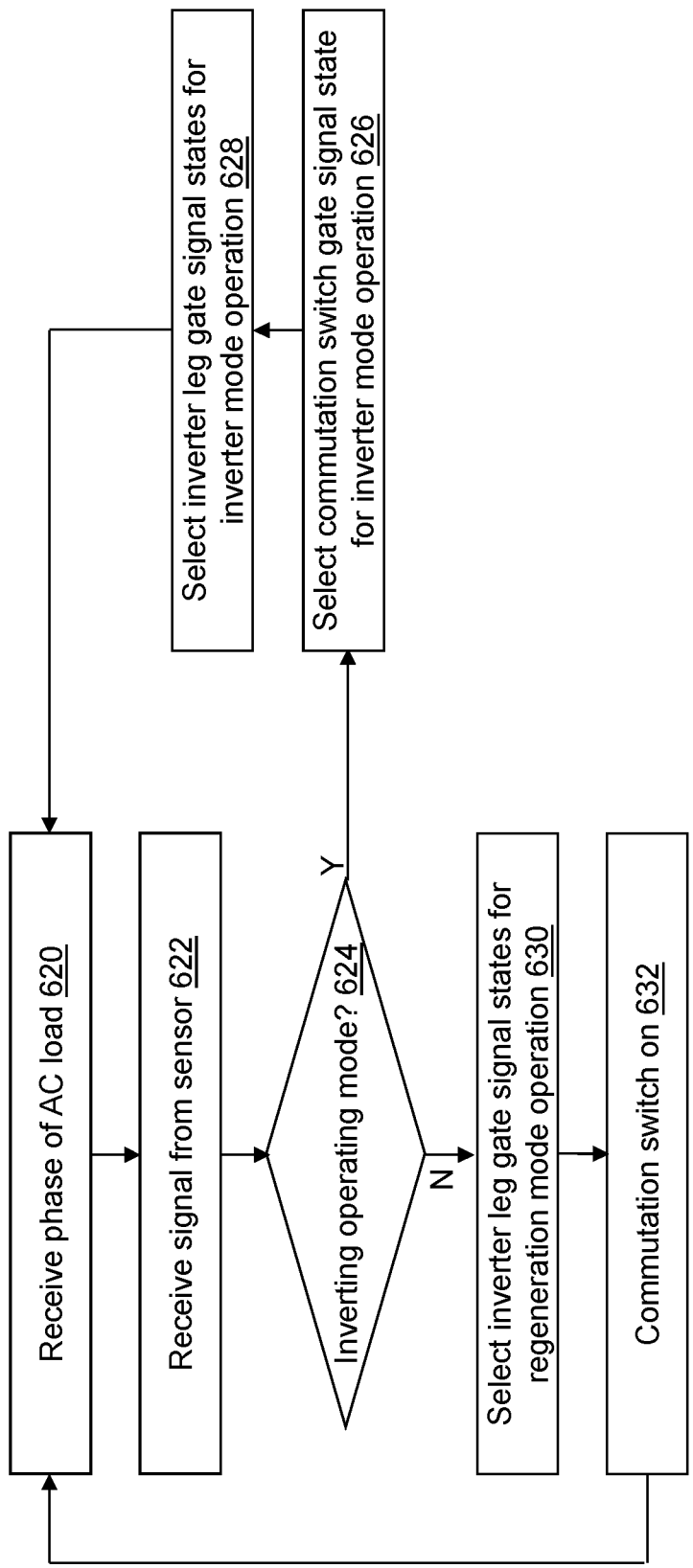
FIG. 6B depicts a flow diagram illustrating examples of operations performed by a controller of a current source inverter in accordance with an illustrative embodiment.

Referring to FIG. 6B, example operations associated with control application 612 are described. Additional, fewer, or different operations may be performed depending on the embodiment of control application 612. The order of presentation of the operations of FIG. 6B is not intended to be limiting. Some of the operations may not be performed in some embodiments. Although some of the operational flows are presented in sequence, the various operations may be performed simultaneously, for example, using multiple threads, in various repetitions and/or in other orders than those that are illustrated, for example, using interrupts.

Though not shown, control data 613 may be read into a RAM type of computer readable medium 608 by control application 612 when controller 602 is executing. For example, control data 613 may include various switching frequency timing parameters precomputed for control application 612 for power conversion system 600 as described further below.

In an operation 620, a phase of AC load 616 may be received. A phase-locked-loop may be used to obtain a current three-phase voltage relationship at an output terminal from CSI 100, 400, 500 to AC load 616.

In an operation 622, a signal may be received from sensor(s) 618 that may determine whether power conversion system 600 should be in the inverting operating mode or the regenerating operating mode. For example, when power conversion system 600 is implemented in an electric vehicle (EV), regenerative braking may be used to extend the range of the EV and to save as much as 25% of the total energy required to operate the EV. The EV may typically be in the inverting operating mode until a foot brake signal is detected. Thus, sensor 618 may include a foot brake depression sensor. When the foot brake signal is received by controller 602, controller 602 changes the switching signals sent to CSI 100, 400, 500 to affect a transition to the regenerating operating mode as described further below.

For other applications, such as in a construction crane or an elevator, a speed-loop may be employed to detect when to affect a transition to the regenerating operating mode. Thus, sensor 618 may include a speed sensor. Specifically, when the crane is lowering its freight, a kinetic energy due to a presence of the freight tends to speed up the crane. When this happens, the speed-loop detects the overspeed situation and switches the inverter driving the crane motor to the regenerating operating mode. As a result, the excess energy is fed back to DC current source 614 and the speed of the freight is maintained at the desired level. The EV, crane, elevator, etc. may remain in the regenerating operating mode until sensor(s) 618 no longer indicates the regenerating operating mode is appropriate based on the system operating rules.

In addition to a motor drive application, a bidirectional power flow may be used in a residence between a residence battery and a utility grid and/or a local grid defined for the residence. The time when the inverter should operate in the inverting operating mode or the regenerating operating mode can be determined by a local energy management system of the residence. Though not shown, since the DC-link voltage reverses its direction, to interface with DC current source 614, a power electronics circuit is needed to change the voltage polarity.

In an operation 624, a determination is made concerning whether CSI 100, 400, 500 should be in the inverting operating mode. For example, sensor measurements or logical rules may be used to determine whether CSI 100, 400, 500 should be in the inverting operating mode. When CSI 100, 400, 500 should be in the inverting operating mode, processing continues in an operation 626. When CSI 100, 400, 500 should not be in the inverting operating mode, processing continues in an operation 630.

In operation 626, an on-state or an off-state signal determination is made for commutation switch 114.

In an operation 628, a first DGBD switch on-state, a second DGBD switch on-state, or an DGBD off-state signal determination is made for each inverter leg switch of CSI 100, 400, 500, and processing continues in operation 620 to continue to determine an operating mode and/or switching signals. When CSI 100, 400, 500 is switching to the inverting operating mode from the regenerating operating mode, the phase received in operation 620 may be used to select a next set of switching signals.

Referring to FIGS. 7A-7F, control signal time period snapshots for the example of first CSI 100 are shown for the inverting operating mode in accordance with an illustrative embodiment. The control signal time period snapshots shown referring to FIGS. 7A-7F are used to determine whether each inverter leg switch is in the first DGBD switch on-state, the second DGBD switch on-state, or the DGBD switch off-state, and to determine the on-state or the off-state for commutation switch 114 for the inverting operating mode as described further below.

In operation 630, the first DGBD switch on-state or the DGBD off-state signal determination is made for each inverter leg switch of CSI 100, 400, 500, and processing continues in operation 620. Referring to FIGS. 9A-9F, control signal time period snapshots for the example of first CSI 100 are shown for the regenerating operating mode in accordance with an illustrative embodiment. The control signal time period snapshots shown referring to FIGS. 9A-9F are used to determine whether each inverter leg switch is in the first DGBD switch on-state or the DGBD switch off-state as described further below.

In an operation 632, commutation switch 114 is switched to the on-state if in the off-state, and processing continues in operation 620 to continue to determine an operating mode and/or switching signals.

To define the modulation of first CSI 100, for example, consider a three-phase balanced set of sinusoidal voltage waveforms desired at the output of capacitive filter 106 that is input to AC load 616. A first-phase output waveform (current, voltage, or power), which may be referred as an A-phase waveform, is created by operation of first inverter leg 120 and is output on first phase line 150. A second-phase output waveform (current, voltage, or power), which may be referred as a B-phase waveform, is created by operation of second inverter leg 122 and is output on second phase line 152. A third-phase output waveform (current, voltage, or power), which may be referred to as a C-phase waveform, is created by operation of third inverter leg 124 and is output on third phase line 154. As understood by a person of skill in the art, the current and voltage waveforms are 360/m degrees out of phase with each other, where m represents a number of phases. Thus, $V_A$, $V_B$, and $V_C$ and $I_A$, $I_B$, and $I_C$ are 120 degrees out of phase with each other.

A time interval of one period of the three-phase output waveforms can be divided into six sectors, depending on which of the phase voltages is the most positive and which of the phase voltages is the most negative. For example, in sector I, $V_A$ is the most positive and $V_B$ is the most negative; in sector II, $V_A$ is the most positive and $V_C$ is the most negative; in sector III, $V_B$ is the most positive and $V_C$ is the most negative; in sector IV, $V_B$ is the most positive and $V_A$ is the most negative; in sector V, $V_C$ is the most positive and $V_A$ is the most negative; and in sector VI, $V_C$ is the most positive and $V_B$ is the most negative. CSI 100, 400, 500 remains in a sector for 1/6 of a fundamental period. For example, a fundamental period may be 1/60. Once CSI 100, 400, 500 completes one fundamental period, CSI 100, 400, 500 returns to the first sector.

Figure 7A:
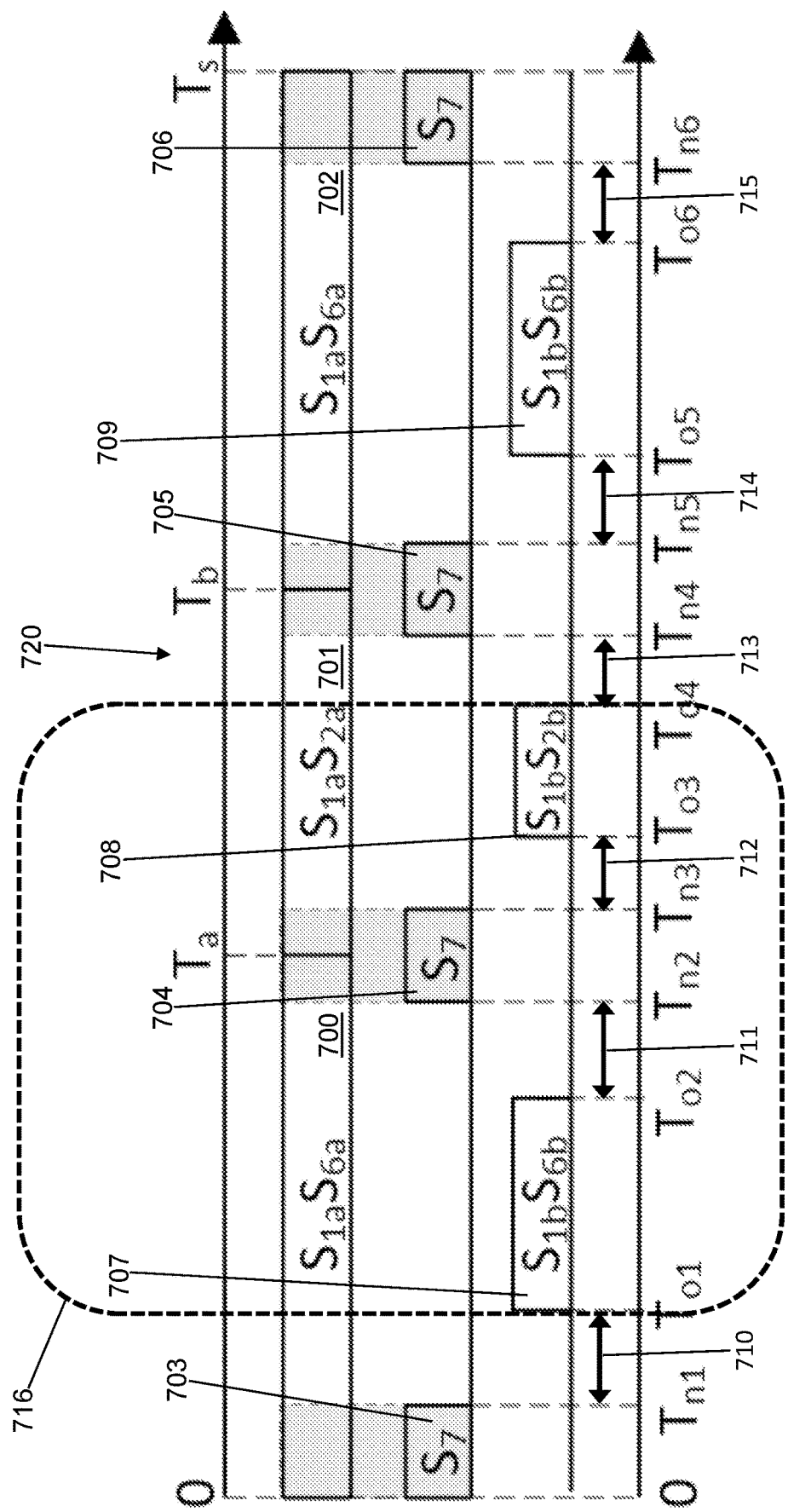
FIGS. 7A-7F are control signal time period snapshots for the current source inverter of FIG. 1 when providing power to an AC load in an inverting operating mode in accordance with an illustrative embodiment.
Figure 7B:
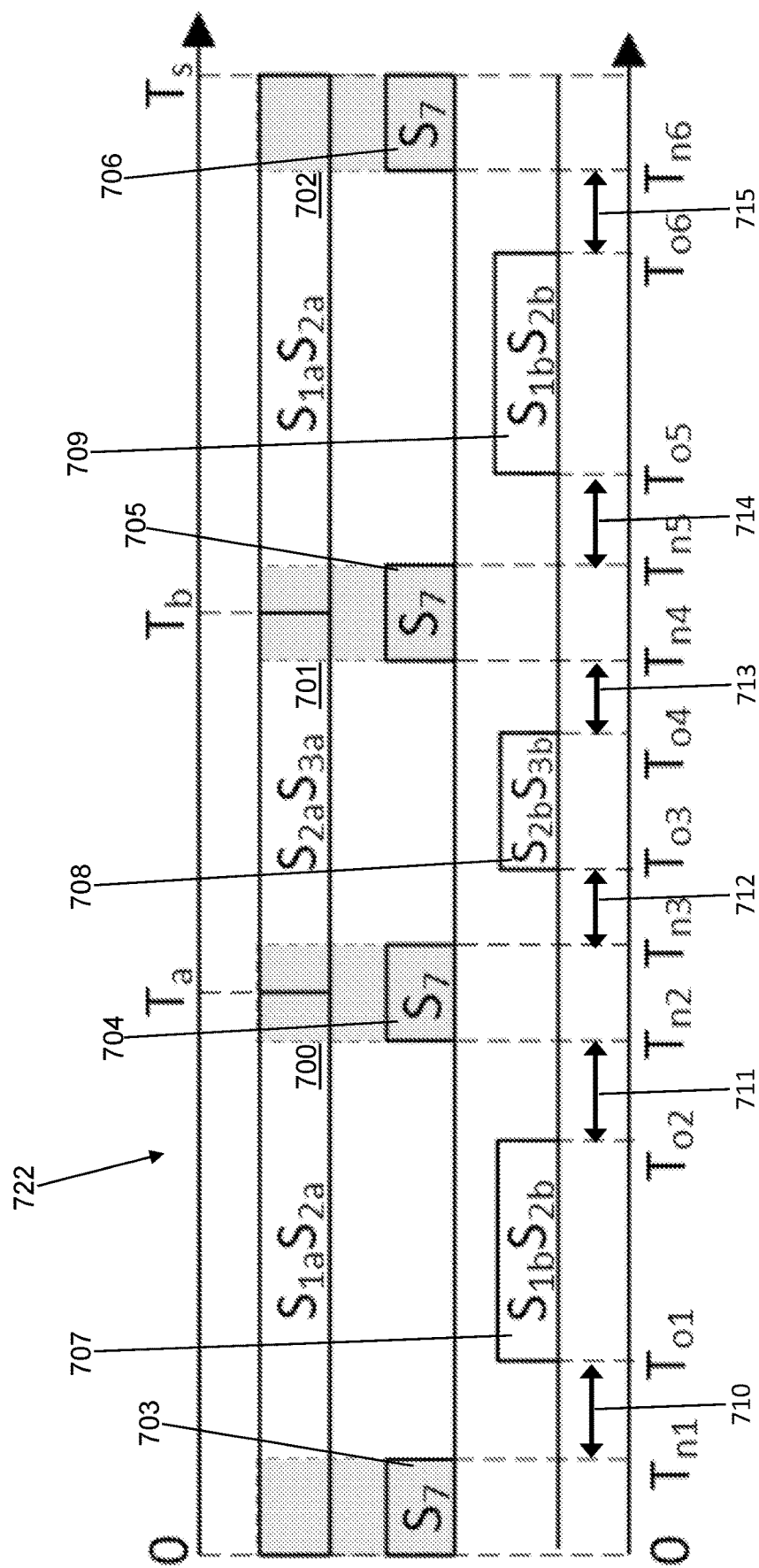
Figure 7C:
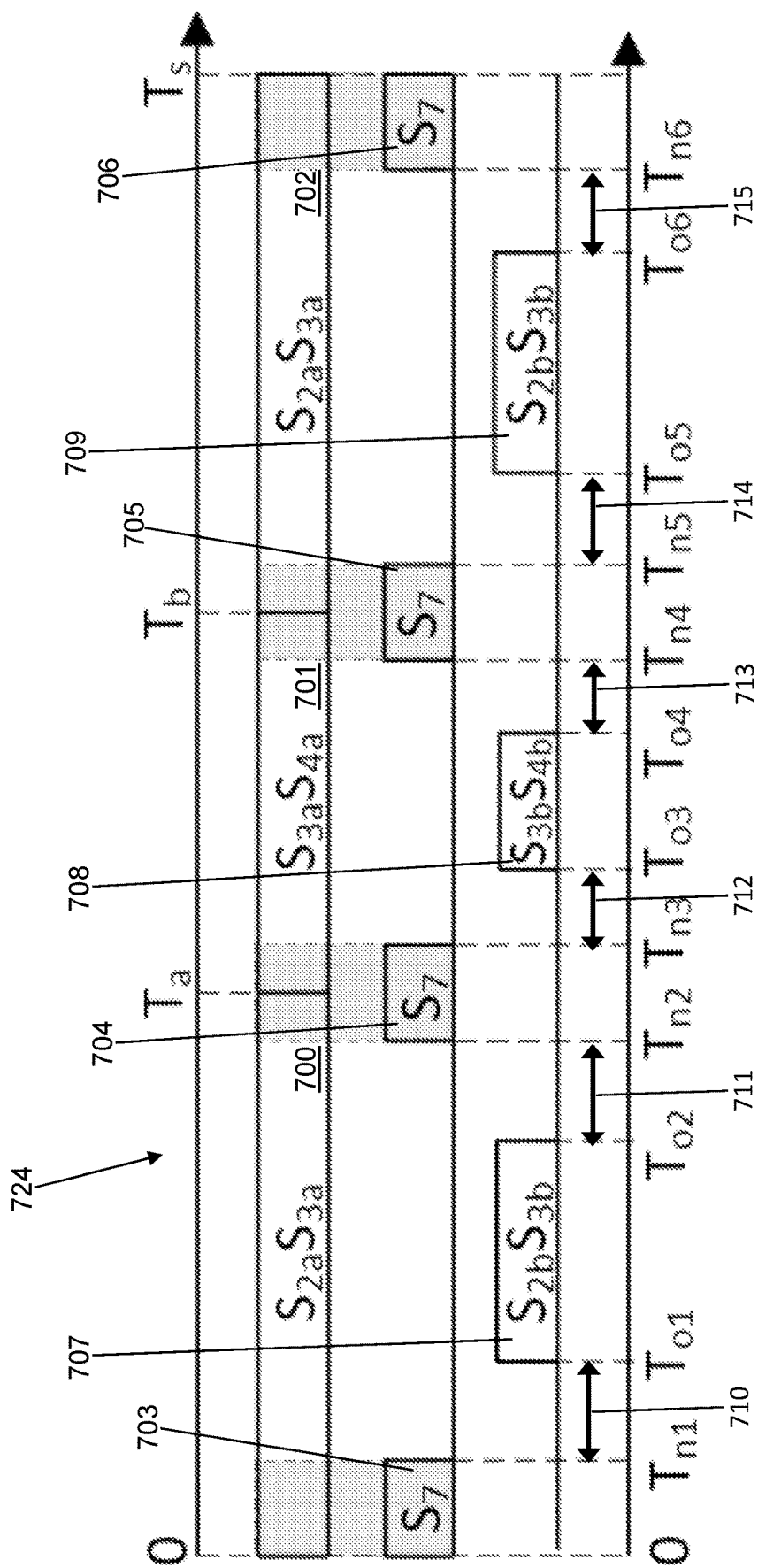
Figure 7D:
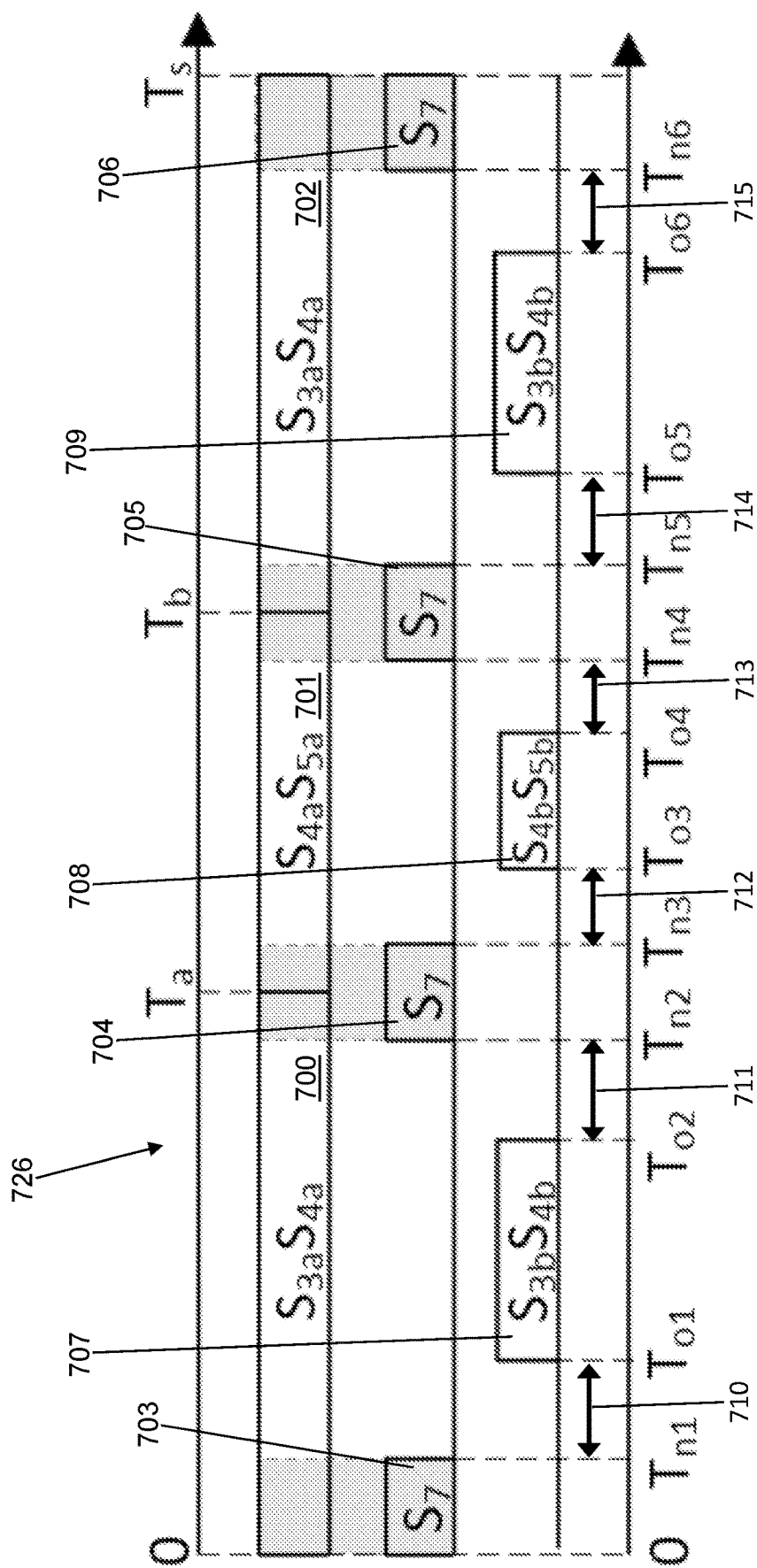
Figure 7E:
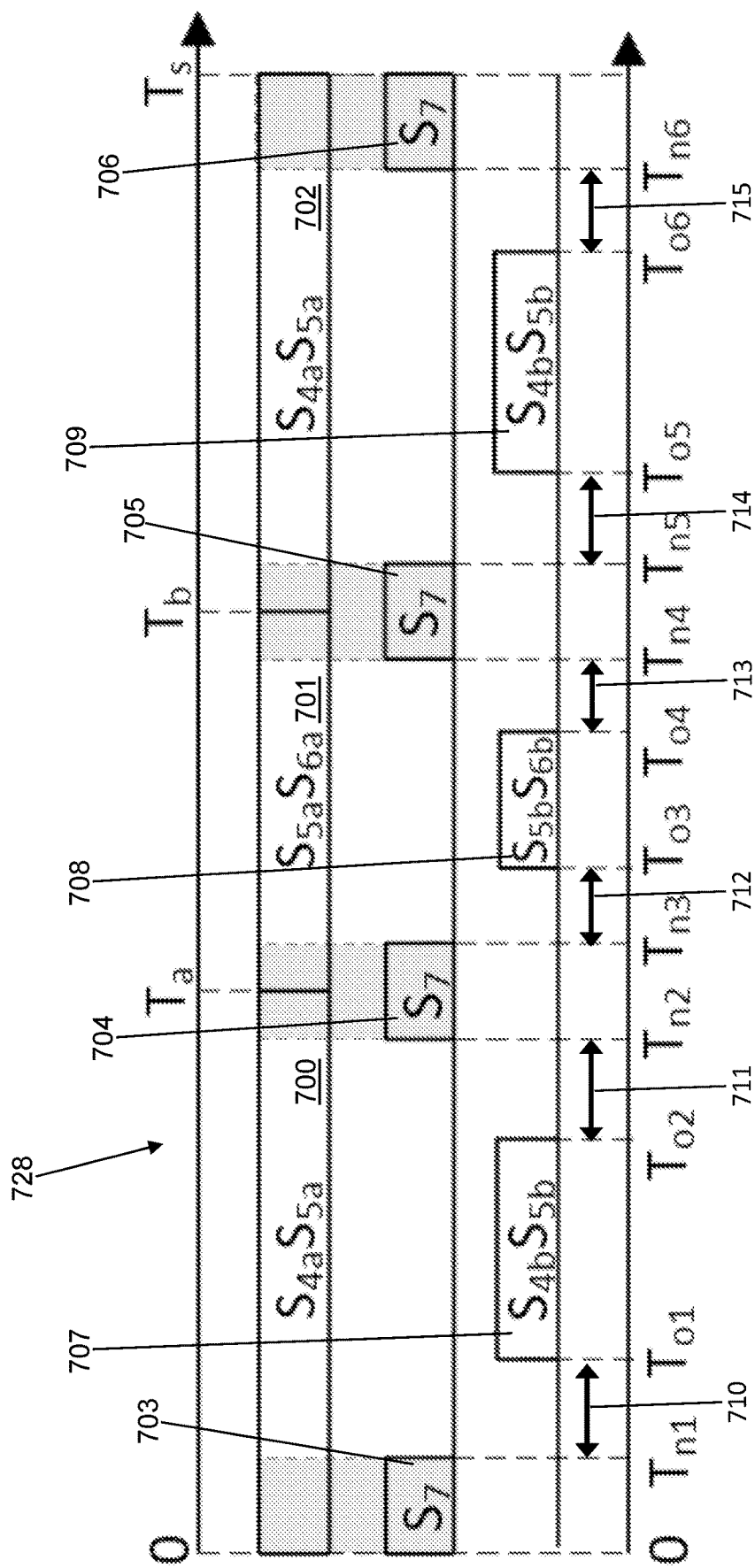
Figure 7F:
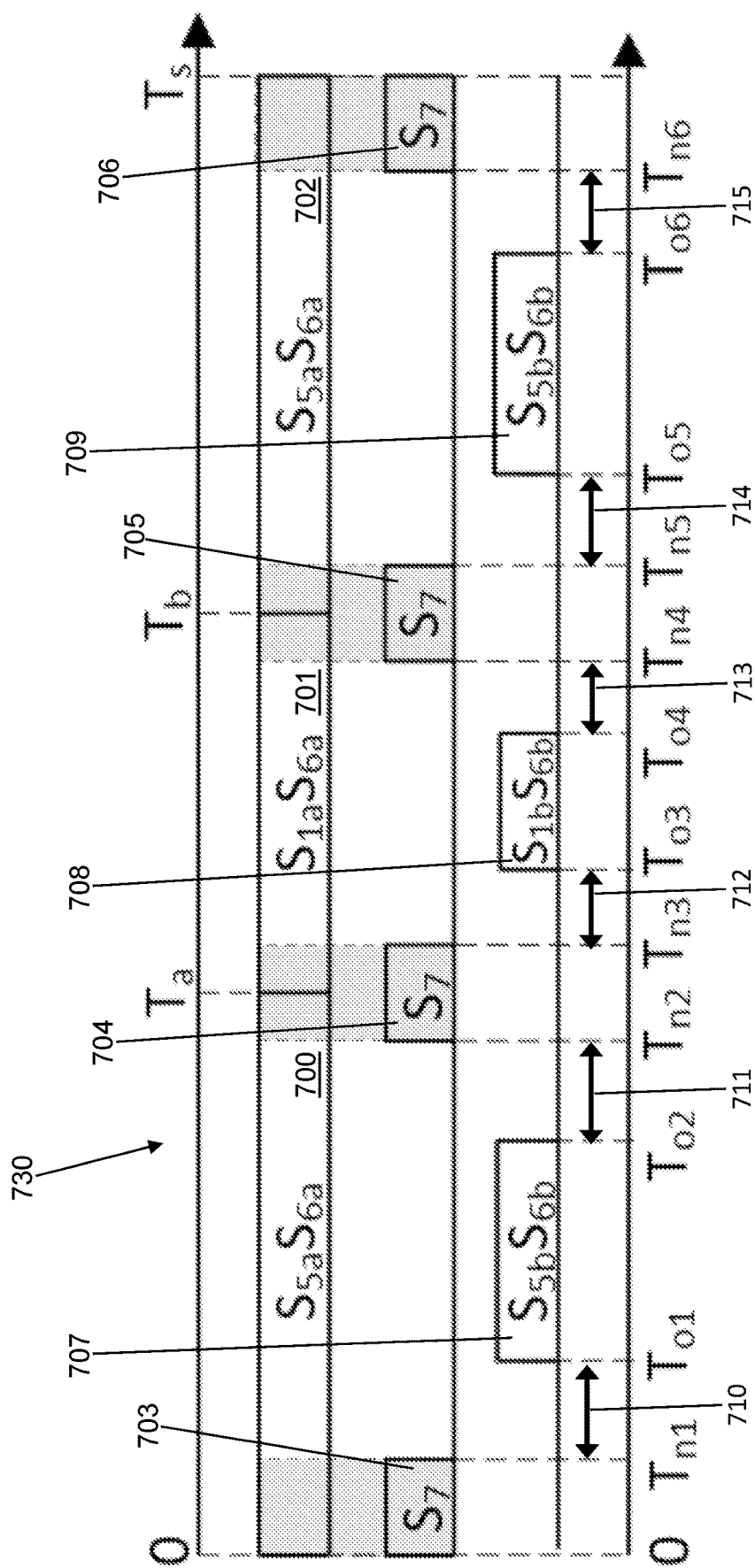

When in the inverting operating mode, control application 612 implements a control algorithm that operates first CSI 100 from sector I to sector VI as summarized in FIGS. 7A-7F respectively, and back to sector I in a continuous loop to continually respond to DC current source 614 and/or AC load 616. FIG. 7A represents sector I. FIG. 7B represents sector II. FIG. 7C represents sector III. FIG. 7D represents sector IV. FIG. 7E represents sector V. FIG. 7F represents sector VI. Of course, when first CSI 100 implements a fewer or a greater number of phase currents, there are a fewer or a greater number of sectors. For example, second CSI 400 has two sectors, and third CSI 500 has fourteen sectors though implemented in a similar manner.

Referring to FIGS. 7A-7F, $S_{1a}$ indicates the on-state for the first semiconductor switch of first switch 126, $S_{1b}$ indicates the on-state for the second semiconductor switch of first switch 126, $S_{2a}$ indicates the on-state for the first semiconductor switch of sixth switch 136, $S_{2b}$ indicates the on-state for the second semiconductor switch of sixth switch 136, $S_{3a}$ indicates the on-state for the first semiconductor switch of third switch 130, $S_{3b}$ indicates the on-state for the second semiconductor switch of third switch 130, $S_{4a}$ indicates the on-state for the first semiconductor switch of second switch 128, $S_{4b}$ indicates the on-state for the second semiconductor switch of second switch 128, $S_{5a}$ indicates the on-state for the first semiconductor switch of fifth switch 134, $S_{5b}$ indicates the on-state for the second semiconductor switch of fifth switch 134, $S_{6a}$ indicates the on-state for the first semiconductor switch of fourth switch 132, $S_{6b}$ indicates the on-state for the second semiconductor switch of fourth switch 132, and $S_7$ indicates the on-state of commutation switch 114.

When the on-state for the first semiconductor switch and the on-state for the second semiconductor switch of the same DGBD switch occur at the same time, the respective DGBD switch is in the first DGBD switch on-state. When the on-state for the first semiconductor switch and the off-state for the second semiconductor switch occur at the same time, the respective DGBD switch is in the second DGBD switch on-state. The pulses indicate when the respective semiconductor switches are turned on. The non-designated switches in each sector are in the DGBD switch off-state. For example, "$S_{1a}S_{6a}$" indicates that the respective pair of first semiconductor switches of first switch 126 and fourth switch 132 are in the on-state based on an on-state control signal provided by the respective PWM signal generator. As another example, "$S_{1b}S_{6b}$" indicates that the respective pair of second semiconductor switches of first switch 126 and fourth switch 132 are in the on-state based on an on-state control signal provided by the respective PWM signal generator. As yet another example, "$S_7$" indicates that commutation switch 114 is in the on-state based on an on-state control signal provided by the respective PWM signal generator such as PWM signal generator 208.

Referring to FIG. 7A, a sector I pulse sequence 720 is shown in accordance with an illustrative embodiment. A first pulse 700 is initiated at a time designated as zero and is ended at a time designated as $T_a$; a second pulse 701 is initiated at the time designated as $T_a$ and is ended at a time designated as $T_b$; a third pulse 702 is initiated at the time designated as $T_b$ and is ended at a time designated as $T_s$ to show a single switching period. In sector I, first pulse 700 is generated for $S_{1a}S_{6a}$ (first switch 126 and fourth switch 132), second pulse 701 is generated for $S_{1a}S_{2a}$ (first switch 126 and sixth switch 136), and third pulse 702 is generated for $S_{1a}S_{6a}$.

In sector I, a fourth pulse 703 is also initiated at the time designated as zero and is ended at a time designated as $T_{n1}$; a fifth pulse 704 is also initiated at a time designated as $T_{n2}$ and is ended at a time designated as $T_{n3}$; a sixth pulse 705 is also initiated at a time designated as $T_{n4}$ and is ended at a time designated as $T_{n5}$; and a seventh pulse 706 is also initiated at a time designated as $T_{n6}$ and is ended at the time designated as $T_s$. In sector I, fourth pulse 703, fifth pulse 704, sixth pulse 705, and seventh pulse 706 are generated for $S_7$, which is commutation switch 114.

In sector I, an eighth pulse 707 is also initiated at a time designated as $T_{o1}$ and is ended at a time designated as $T_{o2}$; a ninth pulse 708 is also initiated at a time designated as $T_{o3}$ and is ended at a time designated as $T_{o4}$; and a tenth pulse 709 is also initiated at a time designated as $T_{o5}$ and is ended at a time designated as $T_{o6}$. In sector I, eighth pulse 707 is generated for $S_{1b}S_{6b}$ (first switch 126 and fourth switch 132), ninth pulse 708 is generated for $S_{1b}S_{2b}$ (first switch 126 and sixth switch 136), and tenth pulse 709 is generated for $S_{1b}S_{6b}$. Thus, in sector I, first switch 126 and fourth switch 132 and first switch 126 and sixth switch 136 are "active" at least a portion of the time, where active indicates that the first on-state or the second on-state is applied to a switch during a switching period defined by $T_s$.

Figure 8A:
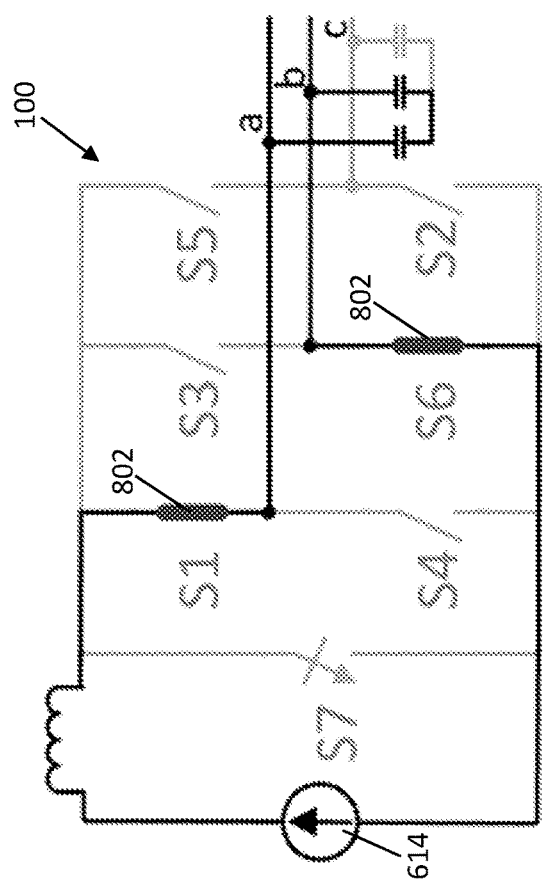

Referring to FIGS. 8A-8F, a description of a switching portion 716 is provided in accordance with an illustrative embodiment. Referring to FIG. 8A, first switch 126 and fourth switch 132 are each in the first DGBD switch state, for example, from the time designated as $T_{o1}$ to the time designated as $T_{o2}$. First switch 126 and fourth switch 132 are fully turned on to conduct the DC-link current through active state $S_1S_6$.

Figure 8B:
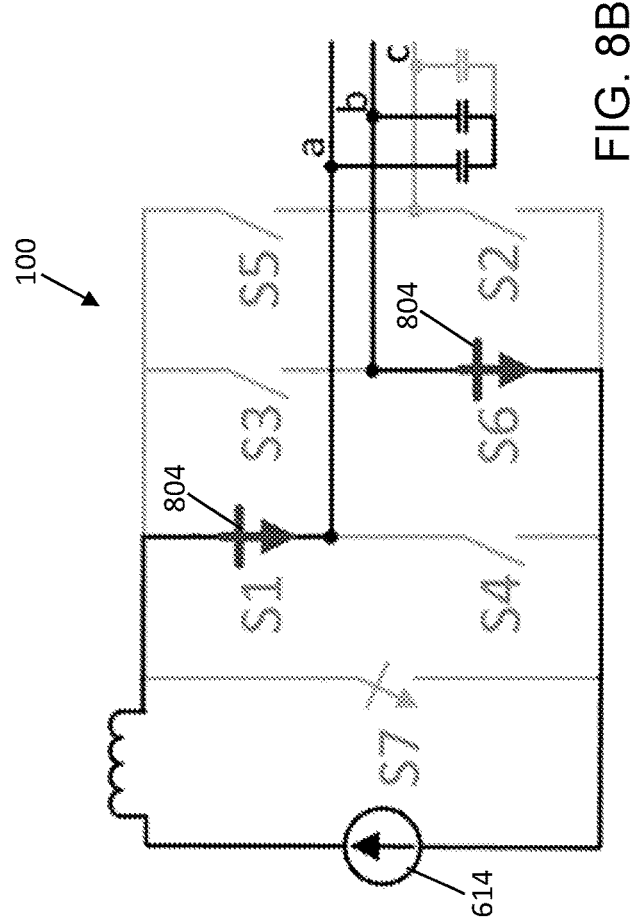

Referring to FIG. 8B, first switch 126 and fourth switch 132 are each in the second DGBD switch state, for example, from the time designated as $T_{o2}$ to the time designated as $T_{n2}$. First switch 126 and fourth switch 132 are behaving as reverse voltage blocking switches.

Referring to FIG. 8C, first switch 126 and fourth switch 132 are each in the second DGBD switch state, and commutation switch 114 is receiving the on-state signal, for example, from the time designated as $T_{n2}$ to the time designated as $T_a$. First switch 126, fourth switch 132, and commutation switch 114 are behaving as reverse voltage blocking switches to avoid an interphase short-circuit.

Referring to FIG. 8D, first switch 126 and sixth switch 136 are each in the second DGBD switch state, and commutation switch 114 is receiving the on-state signal, for example, from the time designated as $T_a$ to the time designated as $T_{n3}$. First switch 126, sixth switch 136, and commutation switch 114 are behaving as reverse voltage blocking switches. A current path for inductor 104 is provided due to commutation switch 114 receiving the on-state signal, and a transition from switch $S_6$ (fourth switch 132) to $S_2$ (sixth switch 136) can be made under zero-current switching (ZCS) conditions. Due to the rise/fall times and propagation delays associated with the switch turn on/off processes, the conduction time of $S_7$ (commutation switch 114) is long enough to cover the complete transition process.

Figure 8F:
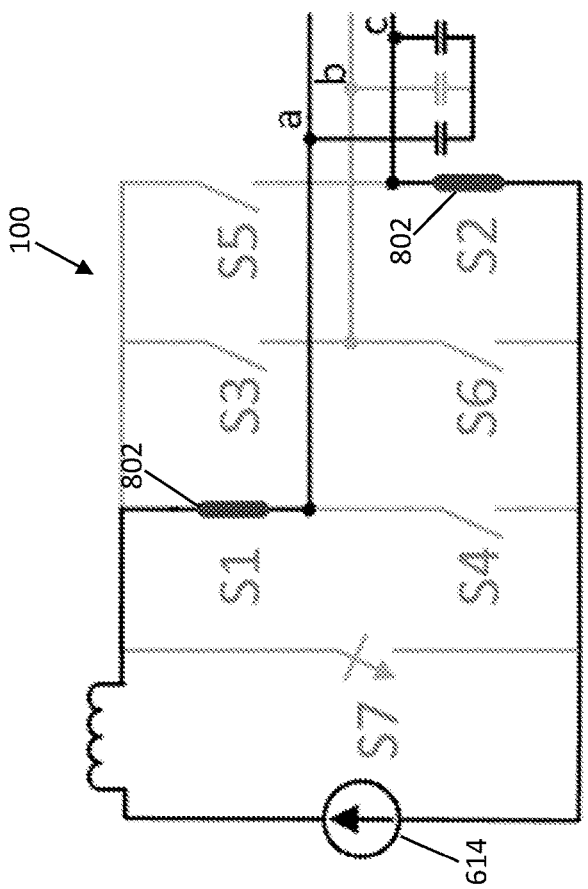
Figure 8E:
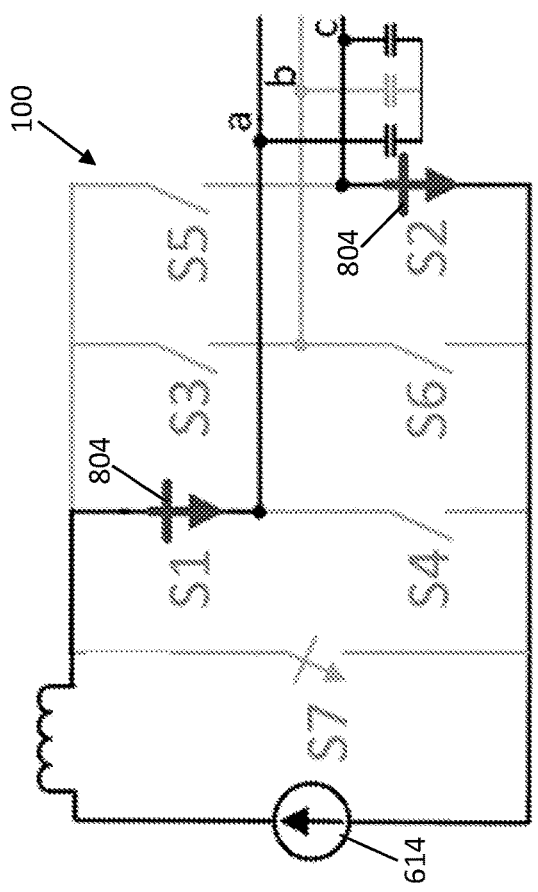

Referring to FIG. 8E, first switch 126 and sixth switch 136 are each in the second DGBD switch state, and commutation switch 114 is receiving the off-state signal, for example, from the time designated as $T_{n3}$ to the time designated as $T_{o3}$. First switch 126 and sixth switch 136 are behaving as reverse voltage blocking switches. Since $S_1$ and $S_2$ are now conducting to provide a current path for the DC-link current, $S_7$ can be turned off.

Referring to FIG. 8F, first switch 126 and sixth switch 136 are each in the first DGBD switch state, from the time designated as $T_{o3}$ to the time designated as $T_{o4}$. The gates of the second semiconductor switches of $S_1$ and $S_2$ are also turned on to reduce the conduction loss of each switch.

The time values can be determined based on known time values for a conventional CSI using six switches that are not bidirectional (H6-CSI), for example, as described in B. Wu, *High-Power Converters and AC Drives*, Ch. 10, pp. 189-218, Wiley, 2006. $T_s$ is the inverter switching period, and $f_s$ is a switching frequency, where $$T_s = \frac{1}{f_s} \cdot I_{ref}$$

is a desired inverter output current waveform peak value, $I_d$ is an inverter DC-link current value, and $m_a$ is a modulation index that ranges from 0 to 1, where $$m_a = \frac{I_{ref}}{I_d} \cdot T_1$$

is the H6-CSI space vector $S_1 S_6$'s dwell time in one $T_s$ without considering overlap time, and $\theta$ is an angle of the space vector, where $$T_1 = m_a \cdot \sin(\frac{\pi}{6} - \theta) \cdot T_s \cdot T_2$$

is the H6-CSI space vector $S_1 S_2$'s dwell time in one $T_s$ without considering overlap time, where $$T_2 = m_a \cdot \sin(\frac{\pi}{6} + \theta) \cdot T_s \cdot T_0$$

is the H6-CSI space vector zero state's dwell time in one $T_s$ without considering overlap time, where $T_0 = T_s - T_1 - T_2$. Using these values, $$T_a = \frac{T_1}{2} + \frac{3}{8}T_0, \; T_b = T_a + T_2 + \frac{1}{4}T_0, \; T_{n1} = \frac{T_0}{4}, \; T_{n2} = T_a - \frac{T_0}{8},$$

$$T_{n3} = T_a + \frac{T_0}{8}, \; T_{n4} = T_b - \frac{T_0}{8}, \; T_{n5} = T_b + \frac{T_0}{8}, \text{ and } T_{n6} = T_s - \frac{T_0}{4}.$$

A first time period 710 is defined between the end of fourth pulse 703 and the initiation of eighth pulse 707. A second time period 711 is defined between the end of eighth pulse 707 and the initiation of fifth pulse 704. A third time period 712 is defined between the end of fifth pulse 704 and the initiation of ninth pulse 708. A fourth time period 713 is defined between the end of ninth pulse 708 and the initiation of sixth pulse 705. A fifth time period 714 is defined between the end of sixth pulse 705 and the initiation of tenth pulse 709. A sixth time period 715 is defined between the end of tenth pulse 709 and the initiation of seventh pulse 706. First time period 710, second time period 711, third time period 712, fourth time period 713, fifth time period 714, and sixth time period 715 are approximately equal and may be referred to as a dead-band time period $T_{DB}$. The dead-band time period $T_{DB}$ is inserted between switching the state of commutation switch 114 from on to off or off to on and switching the second on-state from on to off or off to on for whichever switches (e.g., first switch 126, second switch 128, third switch 130, fourth switch 132, fifth switch 134, and/or sixth switch 136) are in the first on-state to avoid a short-circuit. Increasing the dead-band time period $T_{DB}$ increases the conduction loss, however, so the value may be selected to avoid the short-circuit, but not too long to avoid increasing the conduction loss. Based on the dead-band time period $T_{DB}$, $T_{o1} = T_{n1} + T_{DB}$, $T_{o2} = T_{n2} - T_{DB}$, $T_{o3} = T_{n3} + T_{DB}$, $T_{o4} = T_{n4} - T_{DB}$, $T_{o5} = T_{n5} = T_{DB}$, and $T_{o6} = T_{n6} - T_{DB}$.

Referring to FIG. 7B, a sector II pulse sequence 722 is shown in accordance with an illustrative embodiment. In sector II, first pulse 700 is generated for $S_{1a}S_{2a}$ (first switch 126 and sixth switch 136), second pulse 701 is generated for $S_{2a}S_{3a}$ (sixth switch 136 and third switch 130), third pulse 702 is generated for $S_{1a}S_{2a}$, eighth pulse 707 is generated for $S_{1b}S_{2b}$, ninth pulse 708 is generated for $S_{2b}S_{3b}$, and tenth pulse 709 is generated for $S_{1b}S_{2b}$.

Referring to FIG. 7C, a sector III pulse sequence 724 is shown in accordance with an illustrative embodiment. In sector III, first pulse 700 is generated for $S_{2a}S_{3a}$ (sixth switch 136 and third switch 130), second pulse 701 is generated for $S_{3a}S_{4a}$ (third switch 130 and second switch 128), third pulse 702 is generated for $S_{2a}S_{3a}$, eighth pulse 707 is generated for $S_{2b}S_{3b}$, ninth pulse 708 is generated for $S_{3b}S_{4b}$, and tenth pulse 709 is generated for $S_{2b}S_{3b}$.

Referring to FIG. 7D, a sector IV pulse sequence 726 is shown in accordance with an illustrative embodiment. In sector IV, first pulse 700 is generated for $S_{3a}S_{4a}$ (third switch 130 and second switch 128), second pulse 701 is generated for $S_{4a}S_{5a}$ (second switch 128 and fifth switch 134), third pulse 702 is generated for $S_{3a}S_{4a}$, eighth pulse 707 is generated for $S_{3b}S_{4b}$, ninth pulse 708 is generated for $S_{4b}S_{5b}$, and tenth pulse 709 is generated for $S_{3b}S_{4b}$.

Referring to FIG. 7E, a sector V pulse sequence 728 is shown in accordance with an illustrative embodiment. In sector V, first pulse 700 is generated for $S_{4a}S_{5a}$ (second switch 128 and fifth switch 134), second pulse 701 is generated for $S_{5a}S_{6a}$ (fifth switch 134 and fourth switch 132), third pulse 702 is generated for $S_{4a}S_{5a}$, eighth pulse 707 is generated for $S_{4b}S_{5b}$, ninth pulse 708 is generated for $S_{5b}S_{6b}$, and tenth pulse 709 is generated for $S_{4b}S_{5b}$.

Referring to FIG. 7F, a sector VI pulse sequence 730 is shown in accordance with an illustrative embodiment. In sector VI, first pulse 700 is generated for $S_{5a}S_{6a}$ (fifth switch 134 and fourth switch 132), second pulse 701 is generated for $S_{1a}S_{6a}$ (first switch 126 and fourth switch 132), third pulse 702 is generated for $S_{5a}S_{6a}$, eighth pulse 707 is generated for $S_{5b}S_{6b}$, ninth pulse 708 is generated for $S_{1b}S_{6b}$, and tenth pulse 709 is generated for $S_{5b}S_{6b}$. Processing continuously repeats the cycle from FIGS. 7A-7F until there is a change indicated to switch to the regenerating operating mode. Thus, once sector VI pulse sequence 730 is sector I pulse sequence 720 is started again.

Figure 9A:
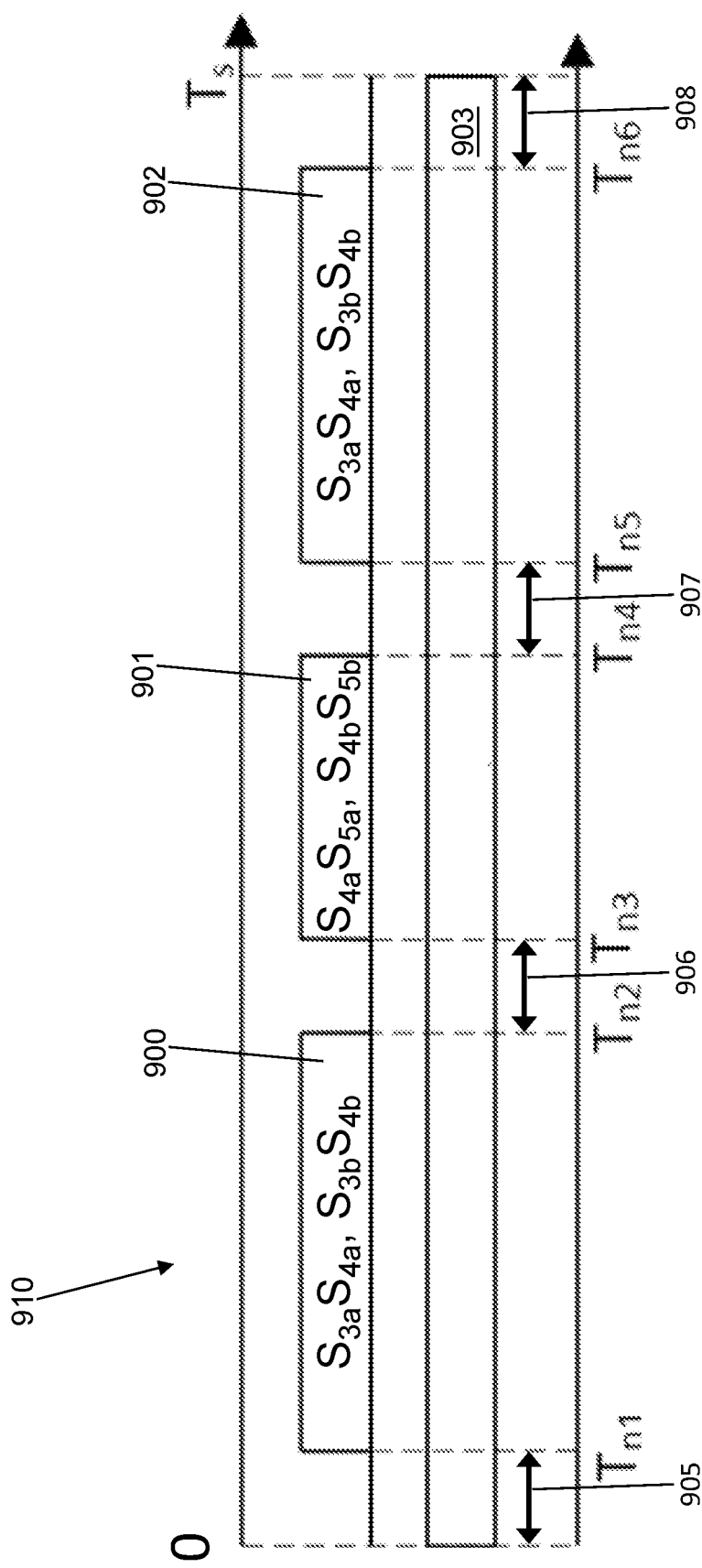
FIGS. 9A-9F are control signal time period snapshots for the current source inverter of FIG. 1 when receiving power from the AC load in a regenerating operating mode in accordance with an illustrative embodiment.
Figure 9B:
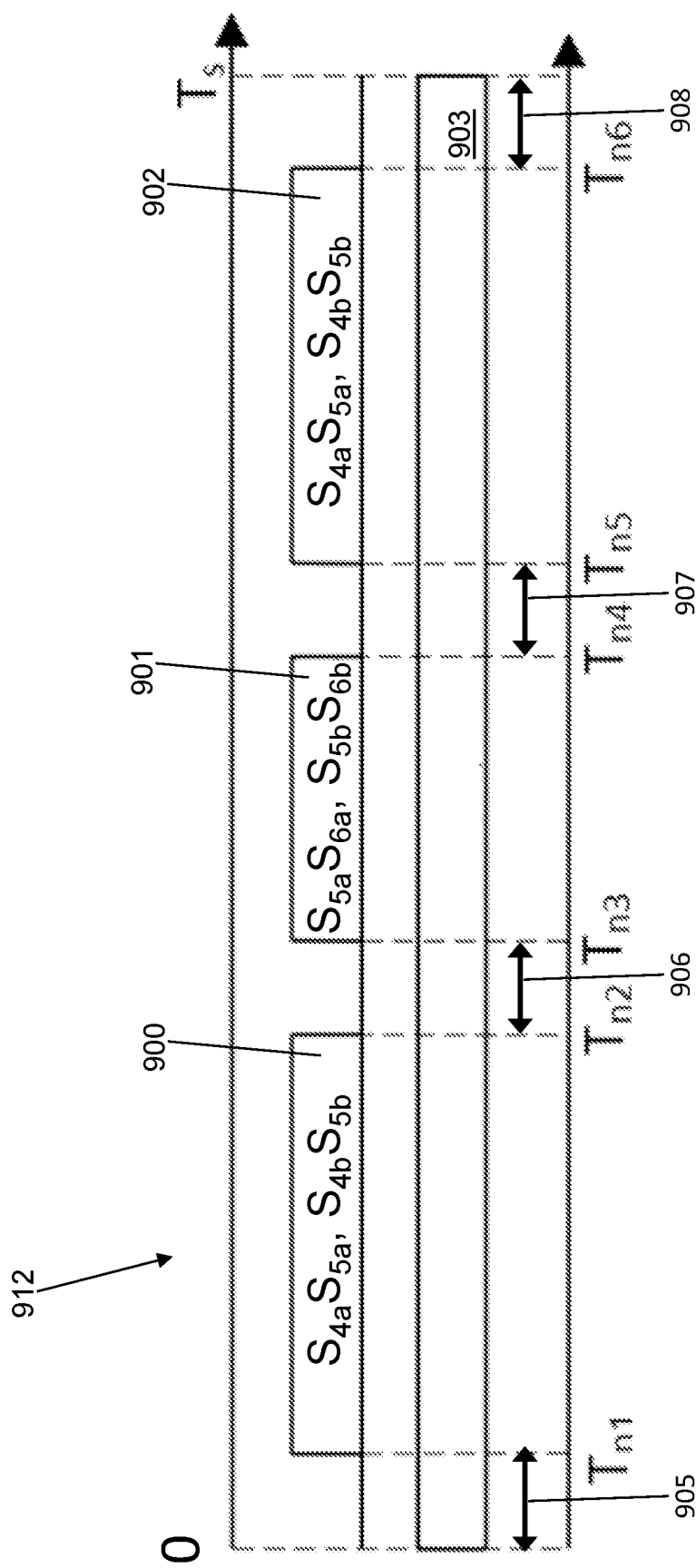
Figure 9C:
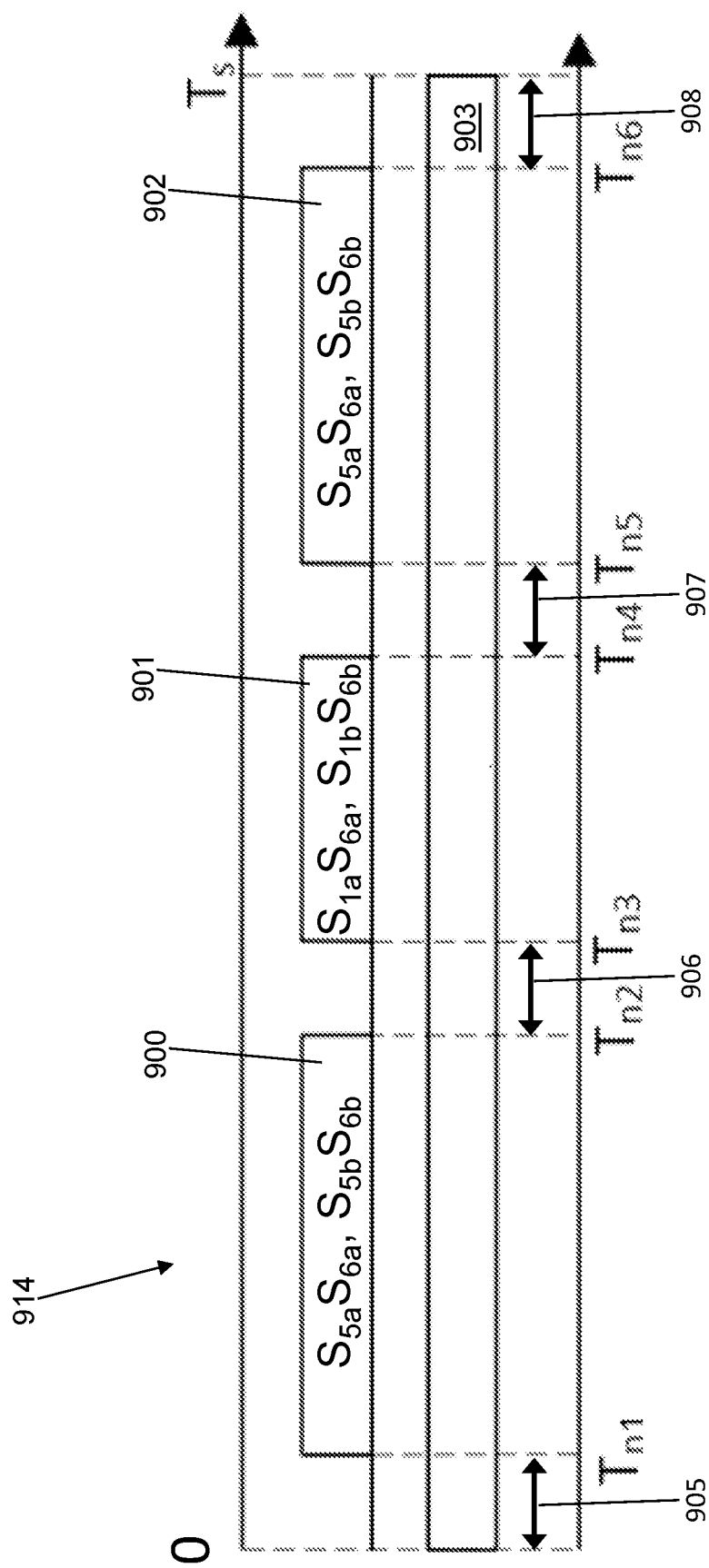
Figure 9D:
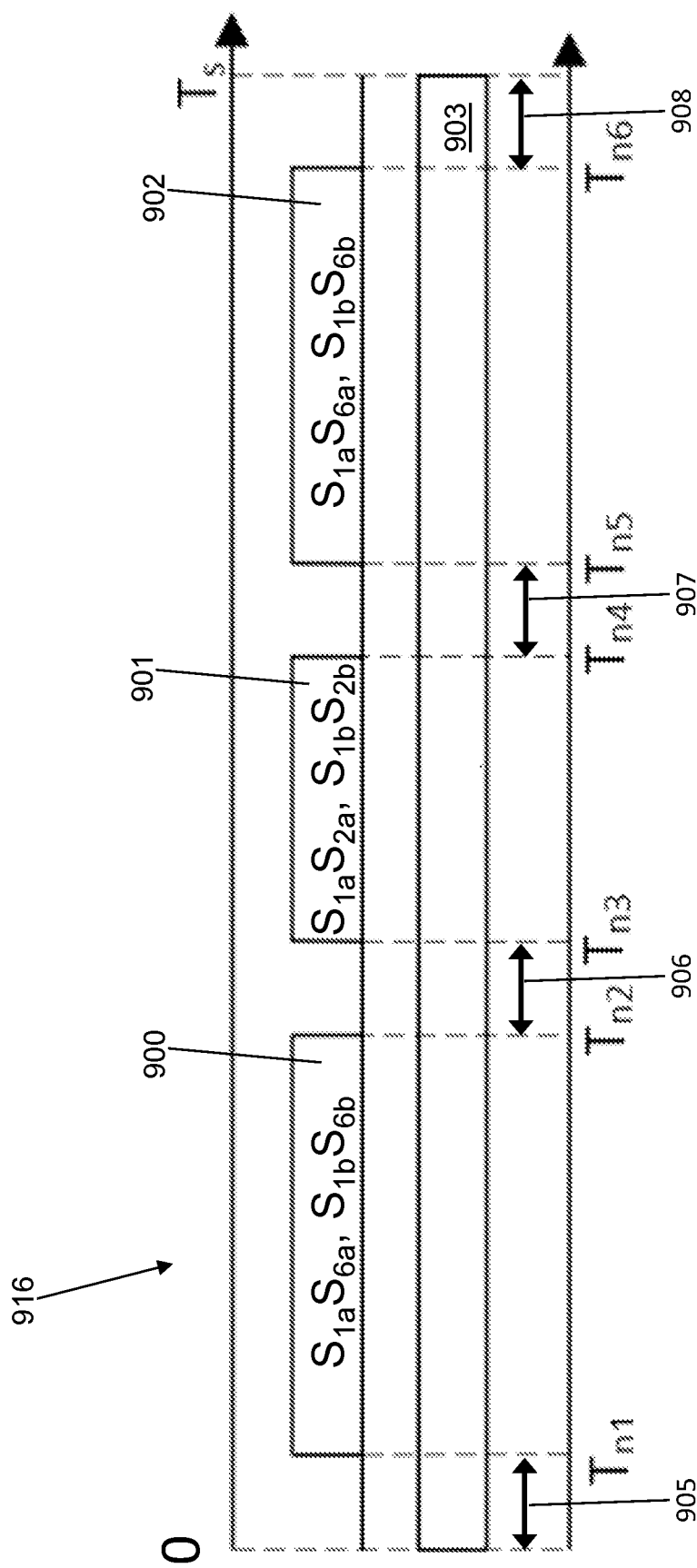
Figure 9E:
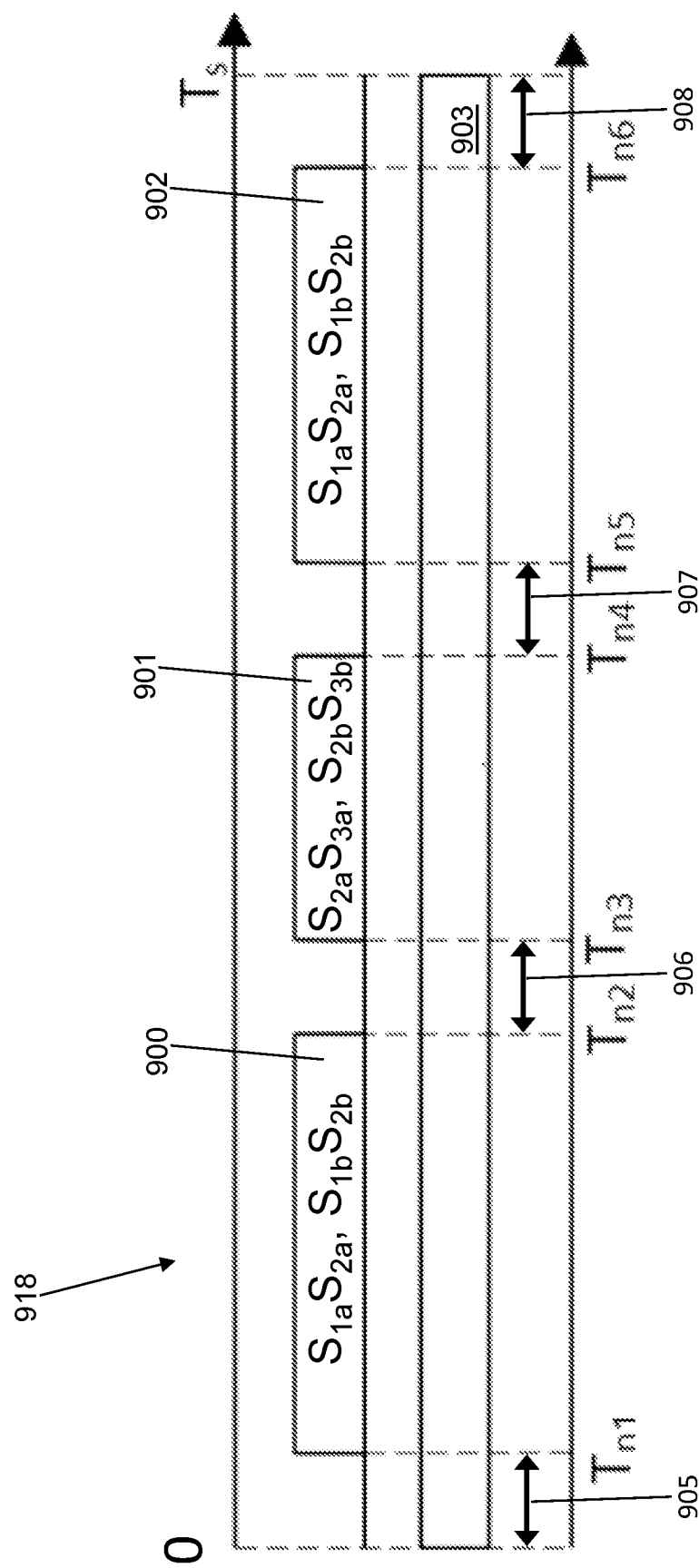
Figure 9F:
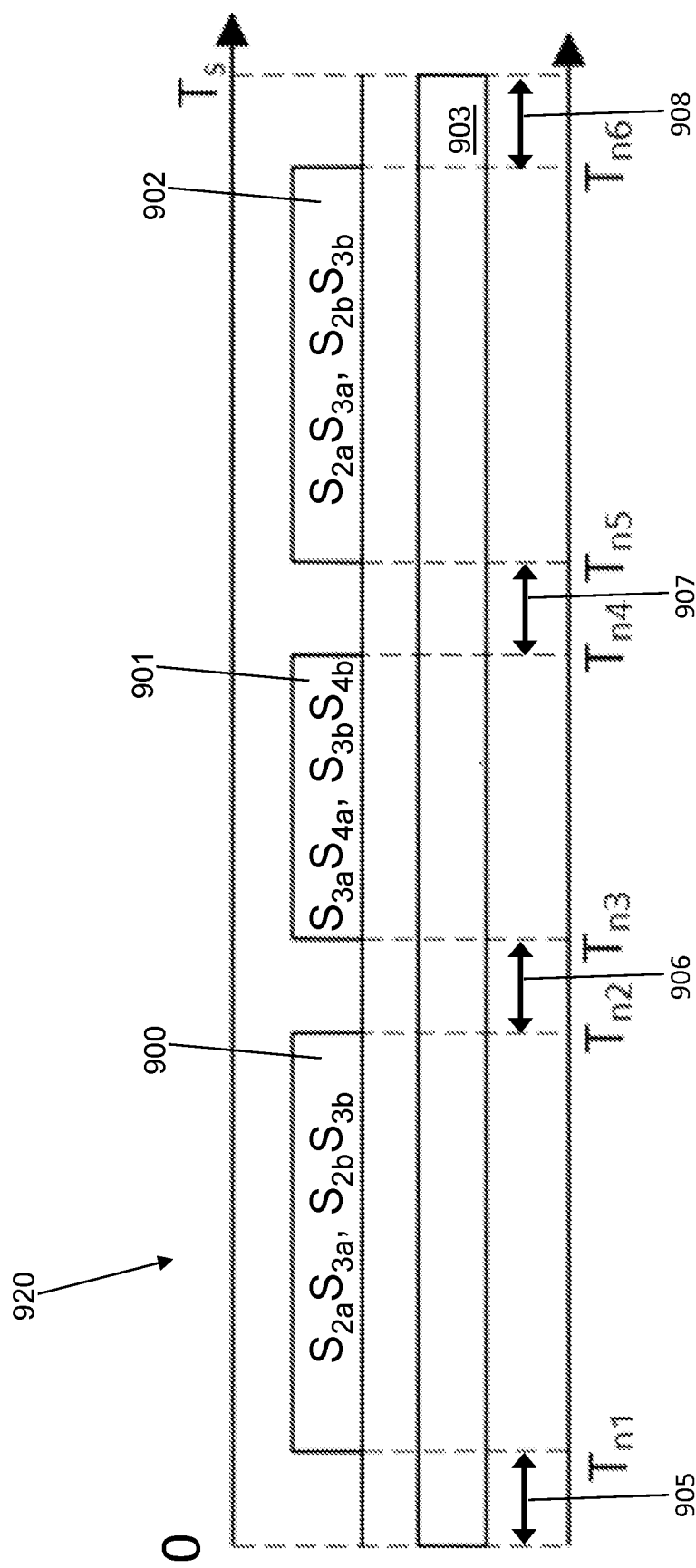

When in the regenerating operating mode, control application 612 implements a control algorithm that operates first CSI 100 from sector I to sector VI as summarized in FIGS. 9A-9F, respectively, and back to sector I in a continuous loop to continually respond to DC current source 614 and/or AC load 616. FIG. 9A represents sector I. FIG. 9B represents sector II. FIG. 9C represents sector III. FIG. 9D represents sector IV. FIG. 9E represents sector V. FIG. 9F represents sector VI.

Referring to FIG. 9A, a sector I pulse sequence 910 for the regenerating operating mode is shown in accordance with an illustrative embodiment. A first pulse 900 is initiated at a time designated as $T_{n1}$ and is ended at a time designated as $T_{n2}$; a second pulse 901 is initiated at the time designated as $T_{n3}$ and is ended at a time designated as $T_{n4}$; a third pulse 902 is initiated at the time designated as $T_{n5}$ and is ended at a time designated as $T_{n6}$. In sector I, first pulse 900 is generated for $S_{3a}S_{4a}$ and for $S_{3b}S4_{4b}$ (third switch 130 and second switch 128 are each in the first DGBD switch state), second pulse 901 is generated for $S_{4a}S_{5a}$ and for $S_{4b}S_{5b}$ (second switch 128 and fifth switch 134 are each in the first DGBD switch state), and third pulse 902 is generated for $S_{3a}S_{4a}$ and for $S_{3b}S4_{4b}$. When in the regenerating operating mode, the on-state signal is continually sent to commutation switch 114 as indicated by a fourth pulse 903.

A first time period 905 is defined between the time designated as zero and the initiation of first pulse 900. A second time period 906 is defined between the end of first pulse 900 and the initiation of second pulse 901. A third time period 907 is defined between the end of second pulse 901 and the initiation of third pulse 902. As defined above, $$T_{n1} = \frac{T_0}{4}, T_{n2} = T_a - \frac{T_0}{8}, T_{n3} = T_a + \frac{T_0}{8},$$

$$T_{n4} = T_b - \frac{T_0}{8}, T_{n5} = T_b + \frac{T_0}{8}, \text{ and } T_{n6} = T_s - \frac{T_0}{4}.$$

In sector I, third switch 130 and second switch 128 are each in the first DGBD switch state, for example, from the time designated as $T_{n1}$ to the time designated as $T_{n2}$ and from the time designated as $T_{n5}$ to the time designated as $T_{n6}$. In sector I, second switch 128 and fifth switch 134 are each in the first DGBD switch state, for example, from the time designated as $T_{n3}$ to the time designated as $T_{n4}$.

Referring to FIG. 9B, a sector II pulse sequence 912 for the regenerating operating mode is shown in accordance with an illustrative embodiment. In sector II, first pulse 900 is generated for $S_{4a}S_{5a}$ and for $S_{4b}S_{5b}$ (second switch 128 and fifth switch 134 are each in the first DGBD switch state), second pulse 901 is generated for $S_{5a}S_{6a}$ and for $S_{5b}S_{6b}$ (fifth switch 134 and fourth switch 132 are each in the first DGBD switch state), and third pulse 902 is generated for $S_{4a}S_{5a}$ and for $S_{4b}S_{5b}$.

Referring to FIG. 9C, a sector III pulse sequence 914 for the regenerating operating mode is shown in accordance with an illustrative embodiment. In sector III, first pulse 900 is generated for $S_{5a}S_{6a}$ and for $S_{5b}S_{6b}$ (fifth switch 134 and fourth switch 132 are each in the first DGBD switch state), second pulse 901 is generated for $S_{1a}S_{6a}$ and for $S_{1b}S_{6b}$ (first switch 126 and fourth switch 132 are each in the first DGBD switch state), and third pulse 902 is generated for $S_{5a}S_{6a}$ and for $S_{5b}S_{6b}$.

Referring to FIG. 9D, a sector IV pulse sequence 916 for the regenerating operating mode is shown in accordance with an illustrative embodiment. In sector IV, first pulse 700 is generated for $S_{1a}S_{6a}$ and for $S_{1b}S_{6b}$ (first switch 126 and fourth switch 132 are each in the first DGBD switch state), second pulse 701 is generated for $S_{1a}S_{2a}$ and for $S_{1b}S_{2b}$ (first switch 126 and sixth switch 136 are each in the first DGBD switch state), and third pulse 702 is generated for $S_{1a}S_{6a}$ and for $S_{1b}S_{6b}$.

Referring to FIG. 9E, a sector V pulse sequence 918 for the regenerating operating mode is shown in accordance with an illustrative embodiment. In sector V, first pulse 900 is generated for $S_{1a}S_{2a}$ and for $S_{1b}S_{2b}$ (first switch 126 and sixth switch 136 are each in the first DGBD switch state), second pulse 901 is generated for $S_{2a}S_{3a}$ and for $S_{2b}S_{3b}$ (sixth switch 136 and third switch 130 are each in the first DGBD switch state), and third pulse 902 is generated for $S_{1a}S_{2a}$ and for $S_{1b}S_{2b}$.

Referring to FIG. 9F, a sector VI pulse sequence 920 for the regenerating operating mode is shown in accordance with an illustrative embodiment. In sector VI, first pulse 900 is generated for $S_{2a}S_{3a}$ and for $S_{2b}S_{3b}$ (sixth switch 136 and third switch 130 are each in the first DGBD switch state), second pulse 901 is generated for $S_{3a}S_{4a}$ and for $S_{3b}S_{4b}$ (third switch 130 and second switch 128 are each in the first DGBD switch state), and third pulse 902 is generated for $S_{2a}S_{3a}$ and for $S_{2b}S_{3b}$. Processing continuously repeats the cycle from FIGS. 9A-9F until there is a change indicated to switch to the inverting operating mode.

To summarize, in the inverting operating mode, for each sector, a pair of DGBD switches in different inverter legs is switched between the first DGBD switch state and the second DGBD switch state or vice versa, and commutation switch 114 is switched between the on-state and the off-state when a state changes for one of the pair of DGBD switches in the different inverter legs. In the regenerating operating mode, for each sector, commutation switch 114 is in the on-state, and a pair of DGBD switches in different inverter legs is switched between the first DGBD switch state and the DGBD switch off-state.

Fast-switching CSIs are alternatives to conventional voltage-source inverters (VSIs) due to a higher fault-tolerance, improved reliability, sinusoidal output voltage waveforms, higher temperature capability, and suitability for medium-voltage applications. BD switches can block bidirectional voltages and conduct bidirectional currents, while RB switches block bidirectional voltages, but only conduct unidirectional current. Therefore, when a BD switch is gated on, it can provide a path for reverse-flowing current, which is not the case for an RB switch such as commutation switch 114. Differences in the current-voltage characteristics complicate a direct replacement of RB switches with BD switches in a traditional H6-CSI topology, creating risks of transient overvoltage or overcurrent. Furthermore, the increased switching frequency of BD switches typically leads to elevated common-mode (CM) electro-magnetic interference (EMI) generation in power converters that can pose serious problems for the power electronics and machine loads.

The combination of commutation switch 114 implemented as an RB switch and replacement of the inverter switches with DGBD switches overcomes these issues. The modulation schemes described by FIGS. 7A-7F and FIGS. 9A-9F solve an issue of short-circuits that result when simply replacing the inverter switches with bidirectional switches and further achieve higher efficiency compared to the H6-CSI topology and noticeably reduce a conducted CM EMI.

To compare the efficiency of the H6-CSI using RB switches and the H7-CSI using DGBD switches shown as first CSI 100, two inverters were designed. Both inverters were designed to operate with a 50 kilohertz (kHz) switching frequency, a 100 Hz fundamental frequency, 195 volts of line-to-line root mean square voltage, with 2.0 kilowatts (kW) output. The load for both inverters was a 3-phase resistive-inductive load with 19.1 ohms and 1.6 millihenries (mH) per phase. The H6-CSI topology (labeled as Case 1) used the "FET+Diode" RB switch shown for RB commutation switch 118. For the H7-CSI topology, two cases, Case 2 and Case 3, were considered. In Case 2, hybrid BD switches were adopted using two discrete SiC-MOSFET devices connected as shown in FIG. 3C. More specifically, Case 2 used six dual-gate hybrid BD switches for $S_1$-$S_6$. In addition, a hybrid "FET+Diode" RB switch was used for $S_7$. For Case 3, switches $S_1$-$S_6$ were implemented as projected monolithic BD switches that have the same on-state resistance as standard SiC-MOSFETs with the same voltage and current ratings. Case 3 assumed that the monolithic BD switches adopted a common-drain configuration. A monolithic common-drain BD switch can have nearly identical on-state resistance as a standard switch with the same ratings. All of the other passive components were identical for the three inverter cases.

Inductor 104 was split into two halves with one half of 250 microhenries (μH) connected in source line 138 and the other half of 250 μH connected in second bus line 140. The split inductor arrangement reduces the conducted CM EMI. An overlap time for the H6-CSI was 120 nanoseconds (ns) and the dead-band time period $T_{DB}$ was 120 ns for Case 2 and Case 3, and $m_a$=0.952. First capacitor 108, second capacitor 110, and third capacitor 112 were 3.9 microfarads. The DC-link current was 8.835 Amps (A) for the H6-CSI and was 8.671 A for Case 2 and Case 3.

The H7-CSI using DGBD switches with the modulation scheme of FIGS. 7A-7F generated nearly sinusoidal output voltage and current that was nearly identical to those generated by the H6-CSI using RB switches. Table I below summarizes the loss and simulated efficiency results for all three cases.

TABLE I

| Case | 1 | 2 | 3 |
|---|---|---|---|
| Inverter | H6-CSI | H7-CSI | H7-CSI |
| Switching loss | $S_1$-$S_6$: 6.61 W | $S_1$-$S_6$: 0 W<br>$S_7$: 6.66 W | $S_1$-$S_6$: 0 W<br>$S_7$: 6.66 W |
| Conduction loss | $S_1$-$S_6$: 30.54 W | $S_1$-$S_6$: 19.56 W<br>$S_7$: 1.35 W | $S_1$-$S_6$: 11.91 W<br>$S_7$: 1.35 W |
| Inductor Loss | 15.0 W | 15.0 W | 15.0 W |
| Output capacitors and other losses | 4.5 W | 4.5 W | 4.5 W |
| Total Loss | 56.65 W | 44.41 W | 36.76 W |
| Output power | 1964 W | 1962 W | 1962 W |
| Efficiency | 97.20% | 97.79% | 98.16% |

The switches $S_1$-$S_6$ in the H6-CSI operated under hard switching conditions and experienced significant switching loss. On the contrary, switches $S_1$-$S_6$ of first CSI 100 operated under nearly ZCS conditions resulting in nearly zero switching loss due to the placement of zero states using $S_7$, commutation switch 114. Instead, all of the switching loss is induced in $S_7$, commutation switch 114, and its switching loss is close to the total switching loss in H6-CSI. The use of DGBD switches (either hybrid or monolithic) can reduce first CSI 100's conduction loss significantly compared to H6-CSI using RB switches. $S_7$'s conduction loss in Case 2 and Case 3 is very low even though it uses an RB switch because $S_7$ only conducts during the zero-state of first CSI 100, which is very short for large modulation index conditions. For low modulation index conditions, the conduction loss of $S_7$ is still lower than the conduction loss of the H6-CSI using RB switches during the zero-state because two RB switches must conduct the DC-link current during the zero-state in the H6-CSI compared to the single switch $S_7$ conducting in first CSI 100.

Experiments were conducted to examine the performance of the H6-CSI and first CSI 100. Due to the lack of monolithic BD switches, only Case 1 and Case 2 were evaluated. For Case 1, three half-bridges corresponding to the three switch groups ($S_1$, $S_4$), ($S_3$, $S_6$) and ($S_5$, $S_2$) were fabricated. Each hybrid RB switch consisted of a SiC-MOSFET and a SiC-Schottky diode. The device models were identical to those described above relative to Case 1.

Similarly, for Case 2, three half-bridges were built. For each hybrid DGBD switch, two SiC-MOSFETs were connected in an anti-series configuration, with their sources connected as shown in FIG. 3C. Two gate drives were employed for the two independent gates of the MOSFETs. A separate DC-link printed circuit board (PCB) was used for both inverters. The half-bridges and the DC-link board were mounted on a motherboard. When testing the H6-CSI, the same motherboard was used. However, switch $S_7$ was removed from the DC-link board, and the three half bridges used the hybrid RB switches.

The modulation algorithms were implemented using a Xilinx FPGA controller. For the H6-CSI, the zero state was realized by the simultaneous conduction of $S_1$ and $S_4$. During each state transition, the overlap time was imposed to ensure a current path for inductor 104. The measured output voltage and current waveforms using first CSI 100 were high-quality sinusoids and nearly identical to the H6-CSI waveforms.

Figure 10:
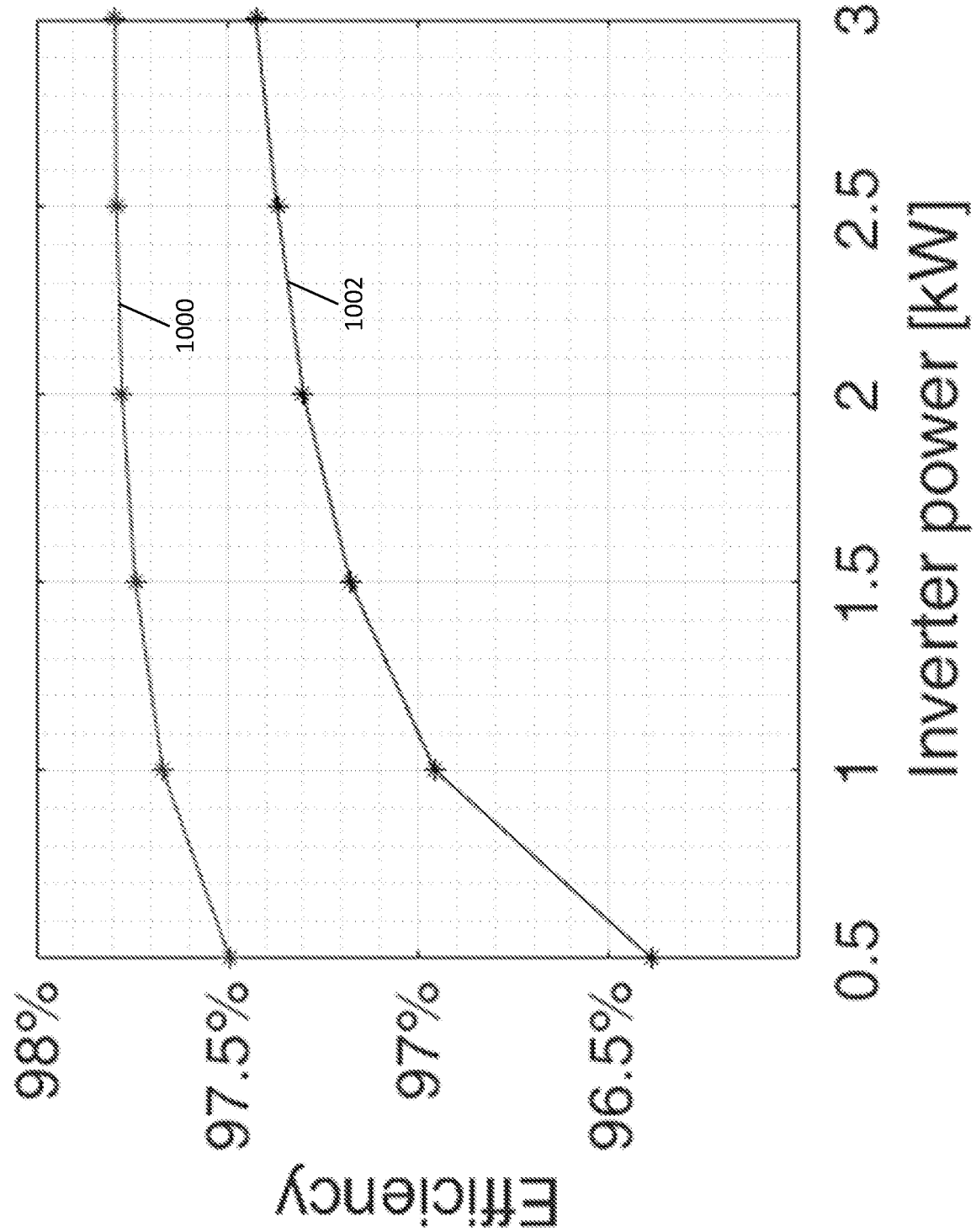
FIG. 10 shows a measured efficiency comparison between the power conversion system of FIG. 6A and an existing power conversion system when each is providing power to the AC load in accordance with an illustrative embodiment.

A Yokogawa WT1806 power analyzer was used to measure the efficiencies of the H6-CSI and first CSI 100. Referring to FIG. 10, a first efficiency curve 1000 shows the efficiency of first CSI 100 as a function of the inverter power, and a second efficiency curve 1002 shows the efficiency of H6-CSI as a function of the inverter power. First CSI 100 achieved significantly improved efficiency compared to the H6-CSI using RB switches. The measured results agree with the simulated efficiency results shown in Table I at 2 kW.

Figure 11:
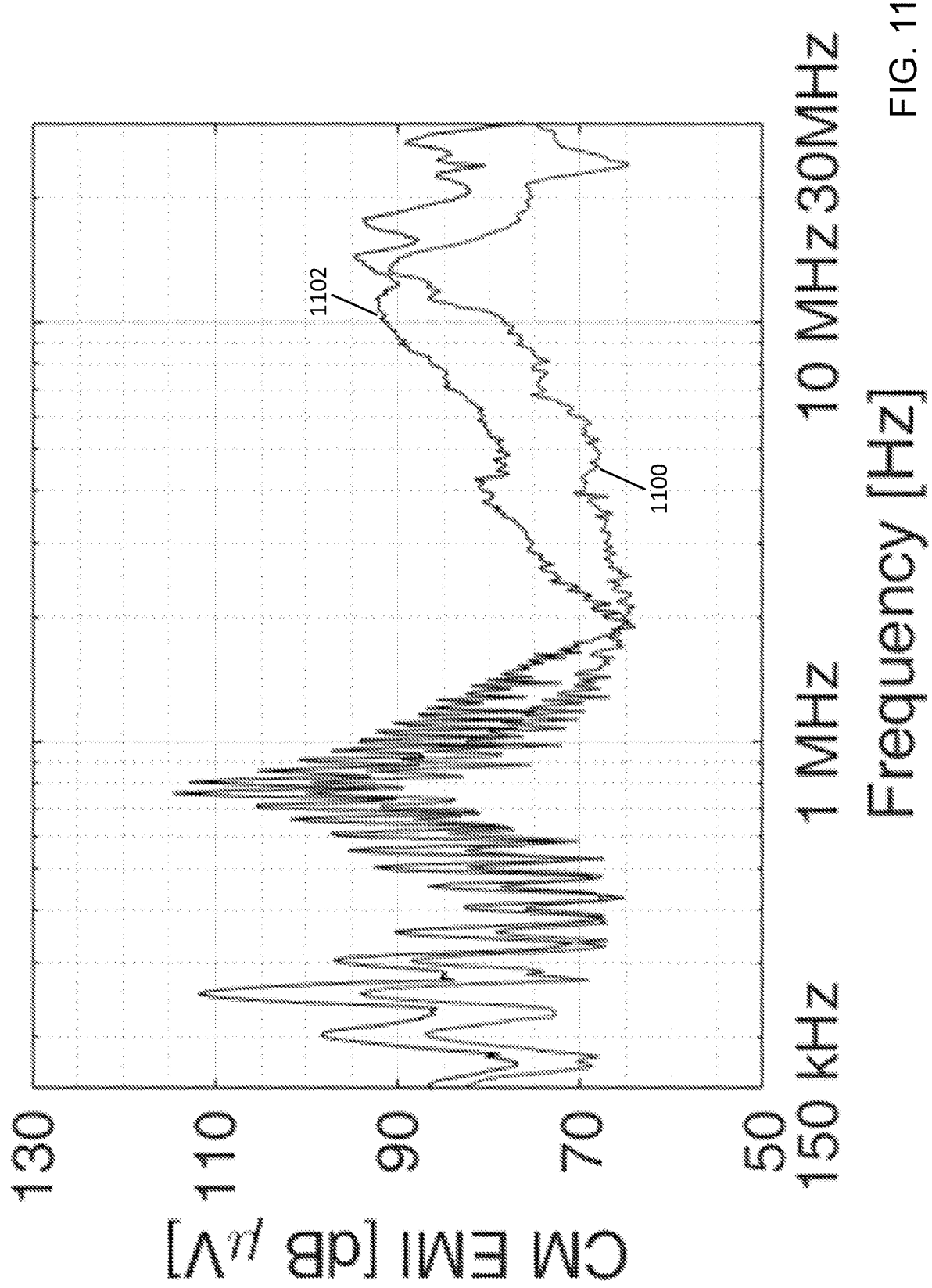
FIG. 11 shows a measured common mode electro-magnetic interference comparison between the power conversion system of FIG. 6A and the existing power conversion system in accordance with an illustrative embodiment.

The CM-EMIs of the H6-CSI and first CSI 100 were measured. Referring to FIG. 11, a first CM-EMI curve 1100 shows the CM-EMI of first CSI 100 as a function of the frequency, and a second CM-EMI curve 1102 shows the CM-EMI of the H6-CSI as a function of the frequency. First CSI 100 exhibited lower CM-EMI compared to the H6-CSI, confirming this benefit of first CSI 100 with the modulation scheme of FIGS. 7A-7F.

Figure 12:
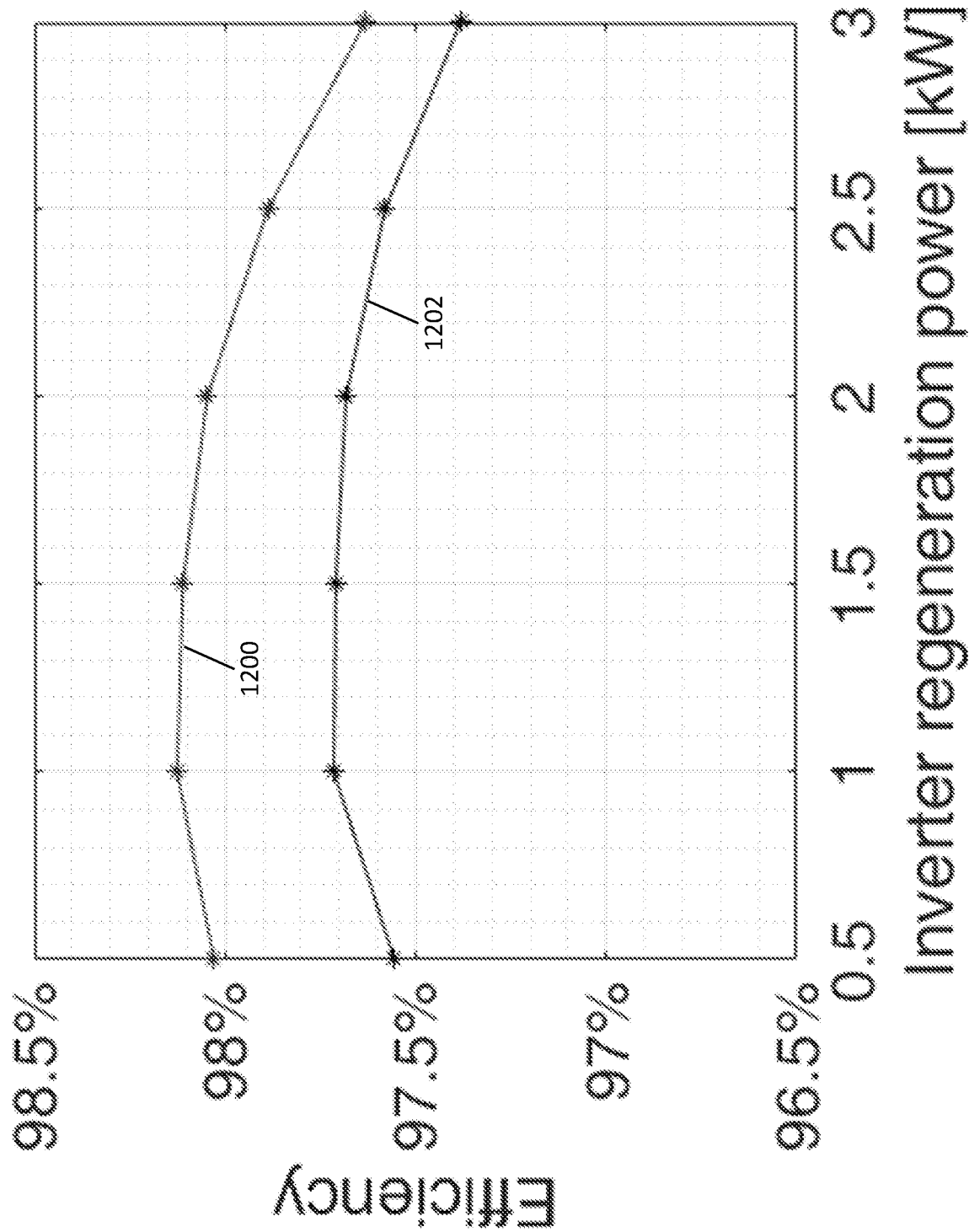
FIG. 12 shows a simulated efficiency comparison between the power conversion system of FIG. 6A and an existing power conversion system when each is receiving power from the AC load in the regenerating operating mode in accordance with an illustrative embodiment.

Referring to FIG. 12, a first regenerating efficiency curve 1200 shows the efficiency of first CSI 100 as a function of the inverter power when in the regenerating operating mode, and a second regenerating efficiency curve 1202 shows the efficiency of the H6-CSI as a function of the inverter power when in the regenerating operating mode. First CSI 100 achieved significantly improved efficiency compared to the H6-CSI using RB switches.

Referring to FIG. 13A, a simulated three-phase voltage generated by first CSI 100 before, during, and after a transition 1312 from providing power to the AC load to receiving power from the AC load is shown in accordance with an illustrative embodiment. Transition 1312 from the inverting operating mode to the regenerating operating mode occurred at ~2 seconds. A first-phase voltage curve 1300 shows an A-phase voltage waveform. A second-phase voltage curve 1302 shows a B-phase voltage waveform. A third-phase voltage curve 1304 shows a C-phase voltage waveform.

Referring to FIG. 13B, a simulated three-phase current generated by first CSI 100 before, during, and after transition 1312 is shown in accordance with an illustrative embodiment. A first-phase current curve 1306 shows an A-phase current waveform. A second-phase current curve 1308 shows a B-phase current waveform. A third-phase current curve 1310 shows a C-phase current waveform. Once regeneration begins, first CSI 100 absorbs energy from AC load 616 and supplies such energy to DC current source 614. Therefore, the current has a 180-degree phase shift as compared to its phase during the inverting operating mode. The voltage phase does not change.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A switching circuit for a current source inverter comprising:
    a reverse-voltage-blocking (RB) commutation switch;
    a first inverter leg comprising
        a first dual-gate bidirectional (DGBD) switch; and
        a second DGBD switch connected in series with the first DGBD switch; and
    a second inverter leg comprising
        a third DGBD switch; and
        a fourth DGBD switch connected in series with the third DGBD switch, wherein the RB commutation switch, the first inverter leg, and the second inverter leg are connected in parallel between a first bus line and a second bus line, wherein a pair of switches comprising a first switch selected from the first DGBD switch or the second DGBD switch of the first inverter leg and a second switch selected from the third DGBD switch or the fourth DGBD switch of the second inverter leg are configured to switch between a first DGBD on-state and a second DGBD on-state when in an inverting operating mode, and wherein the pair of switches comprises a first pair of switches and a second pair of switches; and
    a controller configured to:
        select the first pair of switches from different inverter legs of the first inverter leg and the second inverter leg for switching between the first DGBD on-state and the second DGBD on-state during a first time period of a switching cycle;
        select the second pair of switches from the different inverter legs of the first inverter leg and the second inverter leg for switching between the first DGBD on-state and the second DGBD on-state during a second time period of the switching cycle that immediately follows completion of the first time period, wherein the second pair of switches includes a single switch from the first pair of switches and a single switch from an inverter leg not included in the first pair of switches;
        control a switching state of each DGBD switch of the first to the fourth DGBD switches, wherein the switching state is selected from the first DGBD on-state, the second DGBD on-state, and a DGBD off-state; and
        control switching between an on-state and an off-state of the RB commutation switch, wherein the RB commutation switch is in the on-state during a transition time period initiated prior to the completion of the first time period and stopped after a start of the second time period,
    wherein, when in the first DGBD on-state, a current with a positive polarity or a negative polarity is conducted through a respective DGBD switch of the first to the fourth DGBD switches, and
    wherein, when in the second DGBD on-state, a reverse voltage is blocked by the respective DGBD switch of the first to the fourth DGBD switches, and the current with the positive polarity is conducted through the respective DGBD switch of the first to the fourth DGBD switches.

2. The switching circuit of claim 1, wherein the RB commutation switch comprises:
    a semiconductor switch comprising
        a first RB terminal;
        a second RB terminal; and
        a third RB terminal, wherein, when an RB on-state signal is sent to the first RB terminal, a first current is conducted from the second RB terminal to the third RB terminal; and
    a diode, wherein an anode of the diode is connected to the third RB terminal.

3. The switching circuit of claim 2, wherein the semiconductor switch is a type of semiconductor selected from the group consisting of a metal-oxide-semiconductor field-effect transistor and a high electron mobility transistor.

4. The switching circuit of claim 1, wherein the RB commutation switch comprises:
a bidirectional (BD) switch configured to switch between a BD on-state and a BD off-state, wherein when in the BD on-state, a reverse voltage is blocked by the BD switch, and a second current with the positive polarity is conducted through the BD switch, wherein when in the BD off-state, the second current is not conducted through the BD switch.

5. The switching circuit of claim 1, wherein the first DGBD switch, the second DGBD switch, the third DGBD switch, and the fourth DGBD switch include a transistor selected from the group consisting of a gallium nitride high electron mobility transistor and a silicon-carbide metal-oxide-semiconductor field-effect transistor.

6. The switching circuit of claim 1, wherein the first DGBD switch comprises:
a first semiconductor comprising
a first terminal;
a second terminal; and
a third terminal; and
a second semiconductor comprising
a fourth terminal;
a fifth terminal; and
a sixth terminal;
wherein the first semiconductor is connected anti-series to the second semiconductor.

7. The switching circuit of claim 6, wherein the second terminal is connected to the fifth terminal.

8. The switching circuit of claim 6, wherein, when in the first DGBD on-state, the current with the positive polarity is conducted from the first terminal to the fourth terminal through the second terminal and the fifth terminal, and the current with the negative polarity is conducted from the fourth terminal to the first terminal through the fifth terminal and the second terminal.

9. The switching circuit of claim 6, wherein, when an on-state signal is sent to the third terminal and an on-state signal is sent to the sixth terminal, the first DGBD switch is in the first DGBD on-state.

10. The switching circuit of claim 6, wherein, when an on-state signal is sent to the third terminal and an off-state signal is sent to the sixth terminal, the first DGBD switch is in the second DGBD on-state.

11. The switching circuit of claim 1, wherein the RB commutation switch is in the off-state when the first DGBD switch, the second DGBD switch, the third DGBD switch, or the fourth DGBD switch is in the first DGBD on-state.

12. The switching circuit of claim 1, wherein the first DGBD switch, the second DGBD switch, the third DGBD switch, and the fourth DGBD switch are configured to switch between the first DGBD on-state and the DGBD off-state when in a regenerating operating mode, wherein, when in the DGBD off-state, the current is not conducted through the respective DGBD switch of the first to the fourth DGBD switches.

13. The switching circuit of claim 12, wherein the controller is further configured to control the RB commutation switch to the on-state when in the regenerating operating mode.

14. The switching circuit of claim 13, wherein the controller is further configured to control switching between the first DGBD on-state and the DGBD off-state for each DGBD switch of the first to the fourth DGBD switches when in the regenerating operating mode.

15. The switching circuit of claim 1, further comprising:
a third inverter leg comprising
a fifth DGBD switch; and
a sixth DGBD switch connected in series with the fifth DGBD switch,
wherein the third inverter leg is connected in parallel between the first bus line and the second bus line,
wherein the fifth DGBD switch and the sixth DGBD switch are configured to switch between the first DGBD on-state and the second DGBD on-state when in the inverting operating mode,
wherein the first switch and the second switch of the pair of switches that are selected from different inverter legs of the first inverter leg, the second inverter leg, and the third inverter leg are configured to switch between the first DGBD on-state and the second DGBD on-state when in the inverting operating mode.

16. The switching circuit of claim 15, wherein the controller is further configured to:
select the first pair of switches from the different inverter legs of the first inverter leg, the second inverter leg, and the third inverter leg for switching between the first DGBD on-state and the second DGBD on-state during the first time period of the switching cycle; and
select the second pair of switches from the different inverter legs of the first inverter leg, the second inverter leg, and the third inverter leg for switching between the first DGBD on-state and the second DGBD on-state during the second time period of the switching cycle that immediately follows completion of the first time period.

17. The switching circuit of claim 1, wherein the controller is further configured to control the switching from the second DGBD on-state to the first DGBD on-state during the first time period and the second time period when the RB commutation switch is in the off-state.

* * * * *